(12) United States Patent  (10) Patent No.: US 9,051,657 B2
Karabin  (45) Date of Patent: Jun. 9, 2015

(54) MODULAR ELECTROLYSIS UNIT

(75) Inventor: Tadeusz Karabin, Bellingham, WA (US)

(73) Assignee: Wood Stone Corporation, Bellingham, WA (US)

( * ) Notice: Subject to any disclaimer, the term of this patent is extended or adjusted under 35 U.S.C. 154(b) by 0 days.

(21) Appl. No.: 13/550,247

(22) Filed: Jul. 16, 2012

(65) Prior Publication Data

US 2014/0014502 A1  Jan. 16, 2014

(51) Int. Cl.
| | | |
|---|---|---|
| *C25B 1/10* | (2006.01) | |
| *C25B 1/02* | (2006.01) | |
| *C25B 9/00* | (2006.01) | |
| *C25B 9/18* | (2006.01) | |
| *C25B 15/00* | (2006.01) | |
| *C25B 9/04* | (2006.01) | |

(52) U.S. Cl.
CPC . *C25B 9/18* (2013.01); *C25B 15/00* (2013.01); *C25B 9/04* (2013.01)

(58) Field of Classification Search
CPC .............. C25B 9/00; C25B 9/18; C25B 1/02; C25B 1/10
USPC .................................. 204/242, 252
See application file for complete search history.

(56) References Cited

U.S. PATENT DOCUMENTS

| | | | |
|---|---|---|---|
| 1,222,809 A | 4/1917 | Sebille | |
| 4,137,145 A | 1/1979 | Wallace | |
| 4,431,508 A | 2/1984 | Brown et al. | |
| 4,457,816 A | 7/1984 | Galluzzo et al. | |
| 4,604,171 A | 8/1986 | Morris et al. | |
| 4,654,136 A | 3/1987 | Dang et al. | |
| 4,718,997 A | 1/1988 | Grimes et al. | |
| 4,720,331 A | 1/1988 | Billings | |
| 4,756,817 A * | 7/1988 | Hicks ............................ | 204/253 |
| 5,004,543 A | 4/1991 | Pluskal et al. | |
| 5,667,647 A | 9/1997 | Suga et al. | |
| 5,783,051 A | 7/1998 | Hirai et al. | |
| 5,888,361 A * | 3/1999 | Hirai et al. .................... | 204/262 |
| 6,036,827 A | 3/2000 | Andrews et al. | |
| 6,165,331 A | 12/2000 | Hughes | |
| 6,214,181 B1 | 4/2001 | Iacopetti et al. | |
| 6,254,741 B1 | 7/2001 | Stuart et al. | |
| 6,395,155 B1 | 5/2002 | Bressel et al. | |
| 6,569,298 B2 | 5/2003 | Merida-Donis | |
| 6,740,436 B2 | 5/2004 | Chou et al. | |
| 6,773,561 B1 | 8/2004 | Noaki et al. | |
| 6,852,205 B1 | 2/2005 | Toyoshima et al. | |
| 2003/0216045 A1 | 11/2003 | Wang et al. | |

(Continued)

FOREIGN PATENT DOCUMENTS

| | | |
|---|---|---|
| CN | 20210777 | 1/2012 |
| RU | 1806222 | 3/1993 |

(Continued)

*Primary Examiner* — Zulmariam Mendez
(74) *Attorney, Agent, or Firm* — Dwayne E. Rogge; Schacht Law Office, Inc.

(57) ABSTRACT

This disclosure relates to the field of electrolysis devices. A modular electrolysis unit is specifically disclosed comprising a plurality of interconnecting frames which may have an ion-permeable membrane, or a passive electrode attached and sealed thereto. A frame composing a manifold is also disclosed, in one form with the same attachment system as adjacent membrane frames, passive electrode frames, and endplates to as to allow modular assembly of the overall device.

7 Claims, 18 Drawing Sheets

(56) References Cited

U.S. PATENT DOCUMENTS

2004/0118677 A1 6/2004 Streckert et al.
2005/0072688 A1 4/2005 Meltser
2008/0283392 A1 11/2008 Karabin

FOREIGN PATENT DOCUMENTS

RU 02211885 9/2003
RU 02347653 2/2009

* cited by examiner

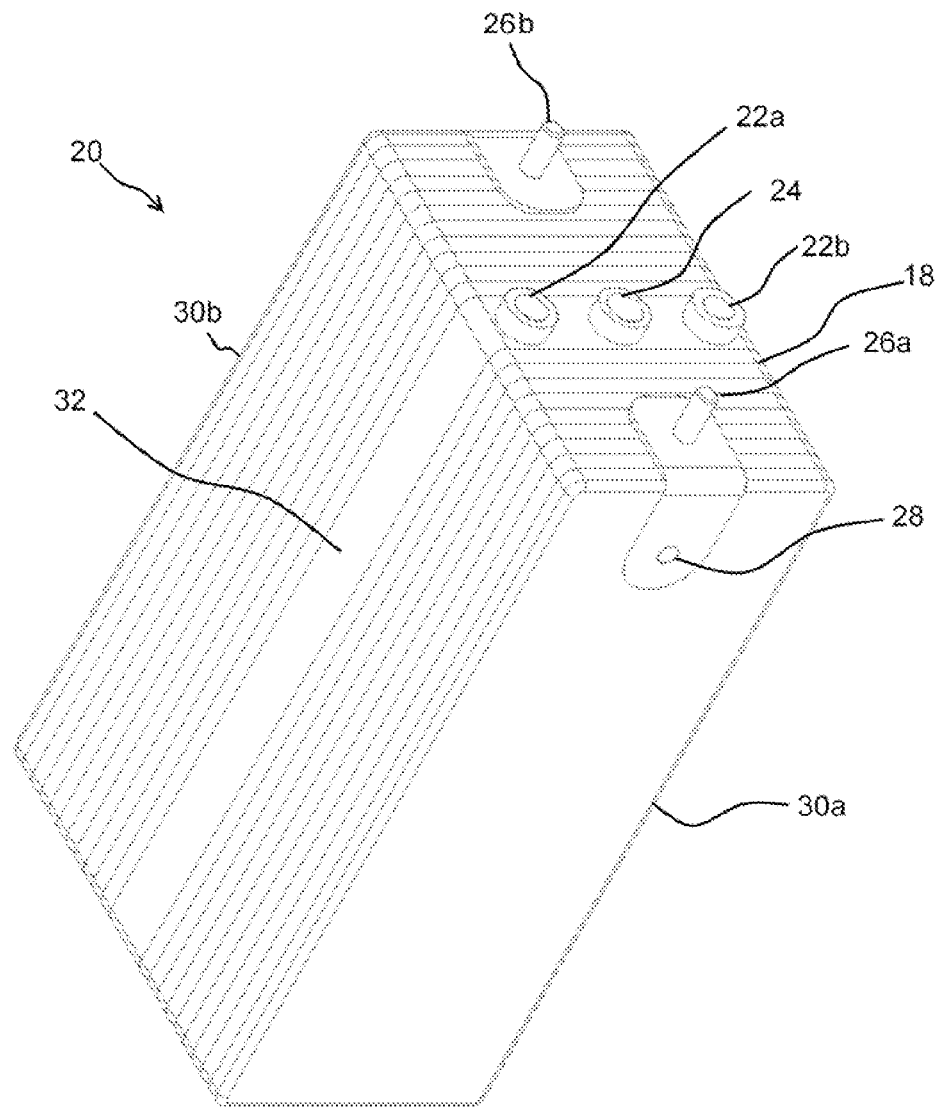
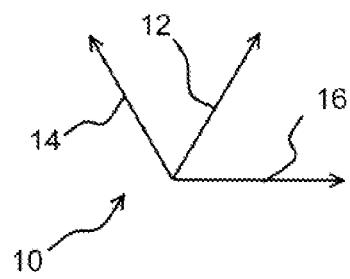
Fig. 1

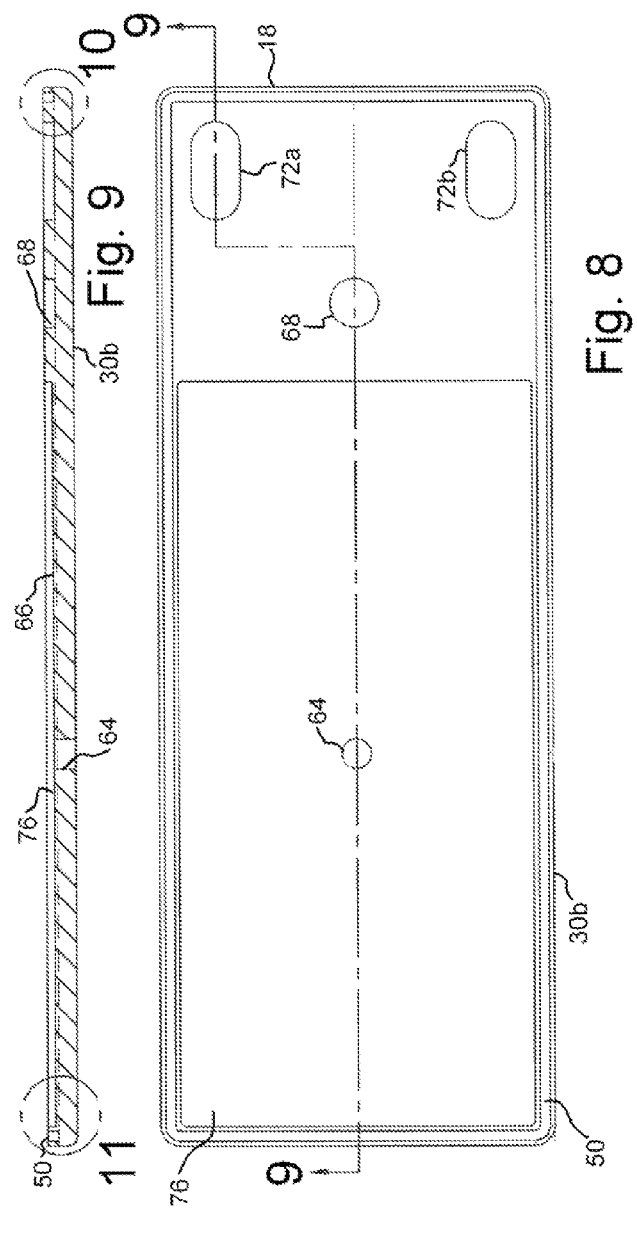

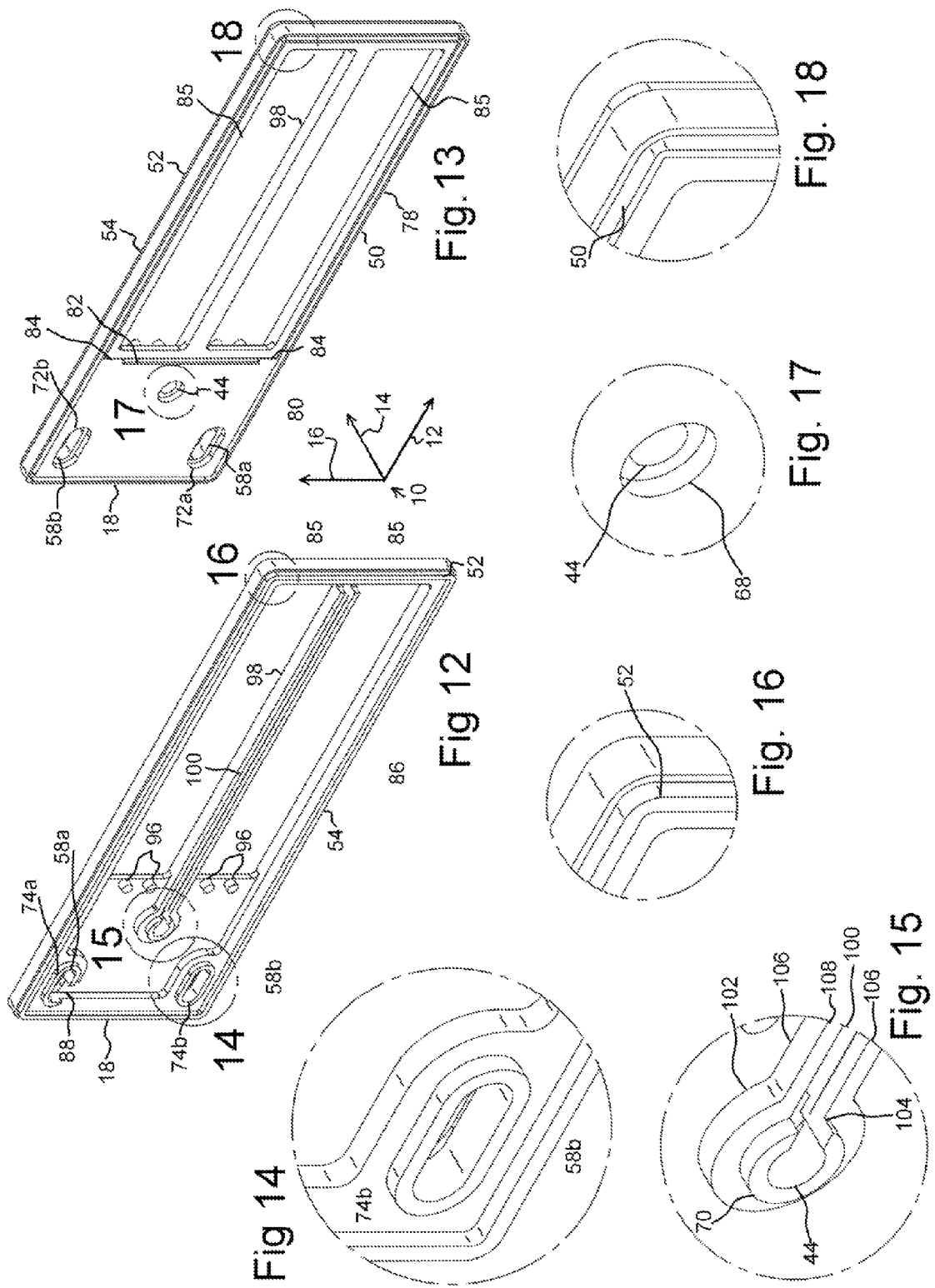

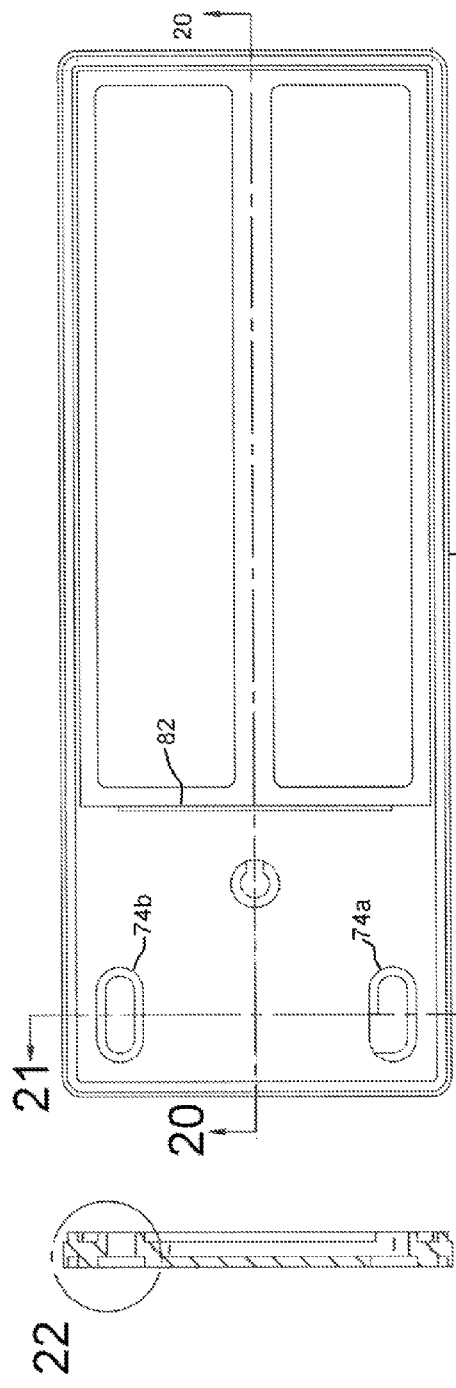
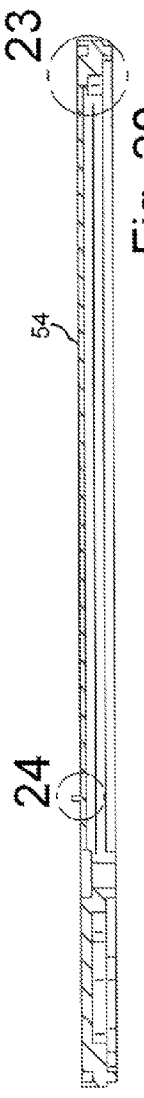
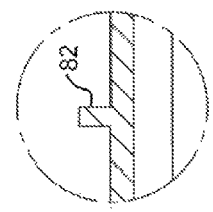
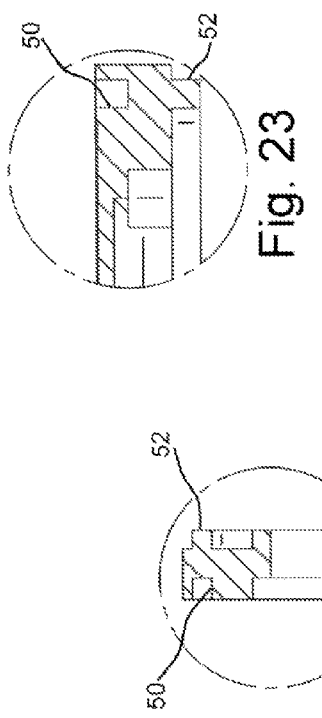
Fig. 19
Fig. 20
Fig. 21
Fig. 22
Fig. 23
Fig. 24

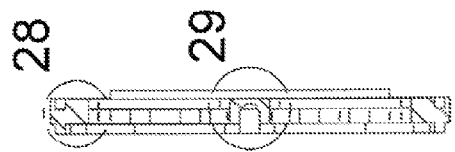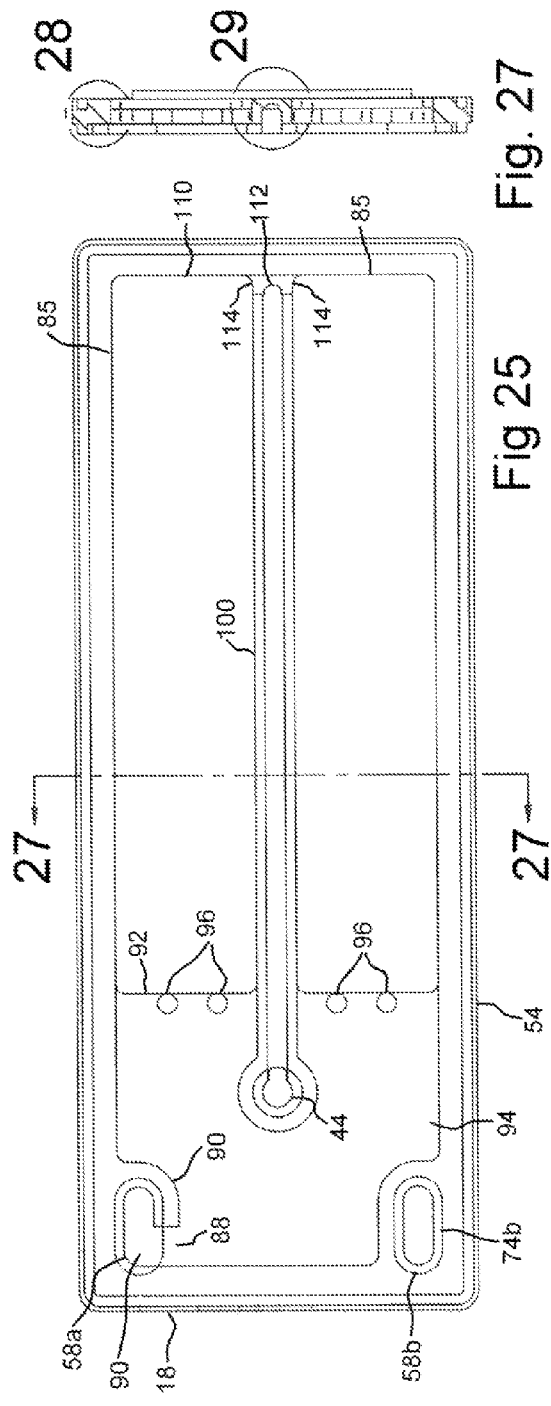

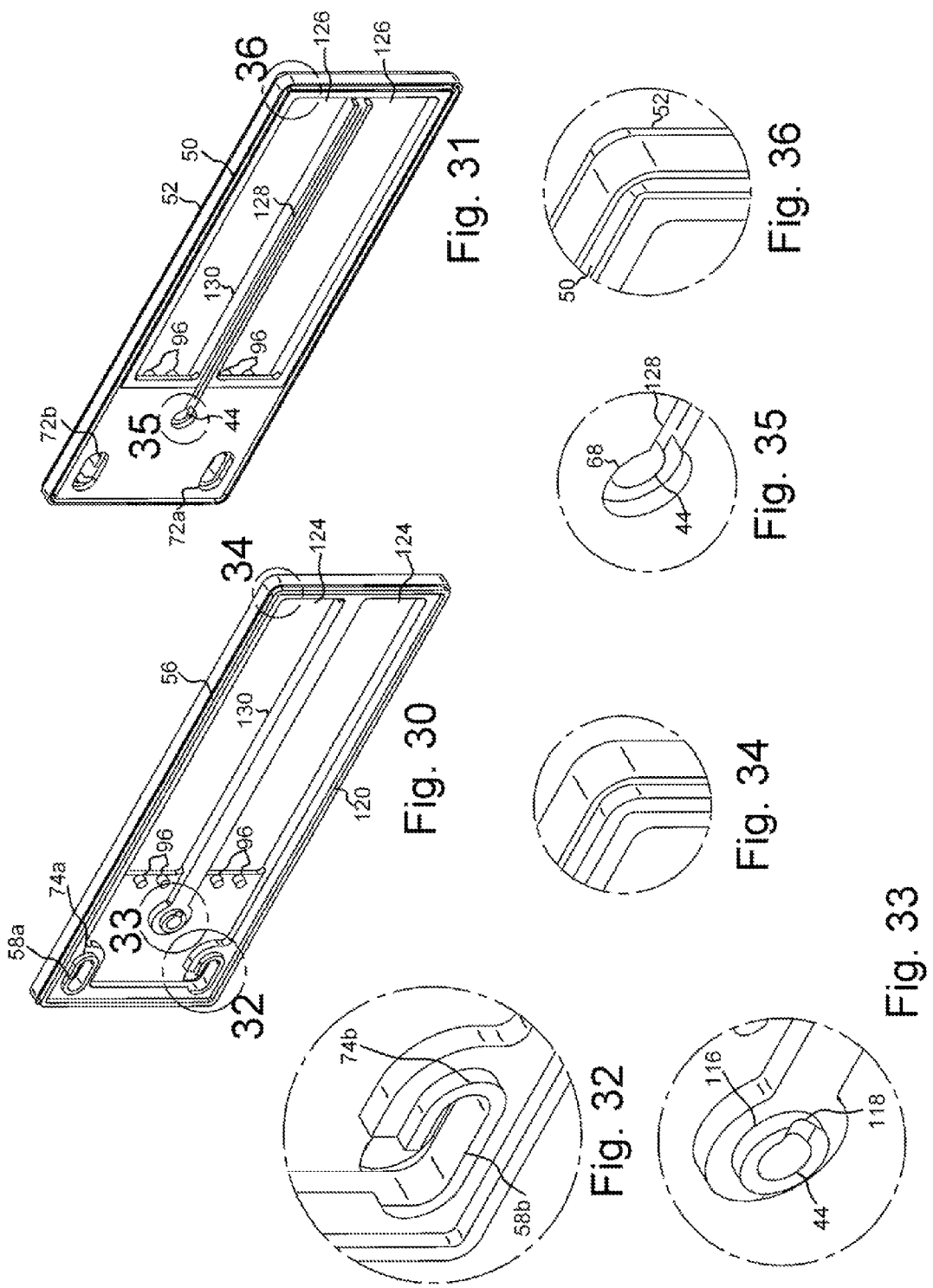

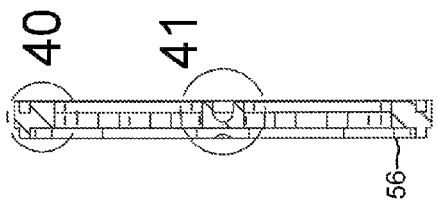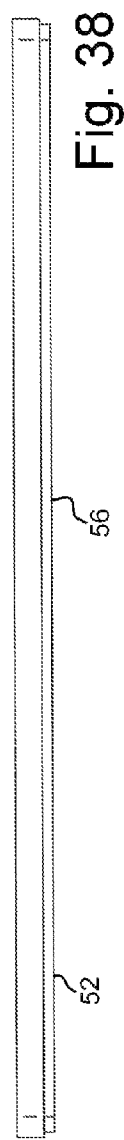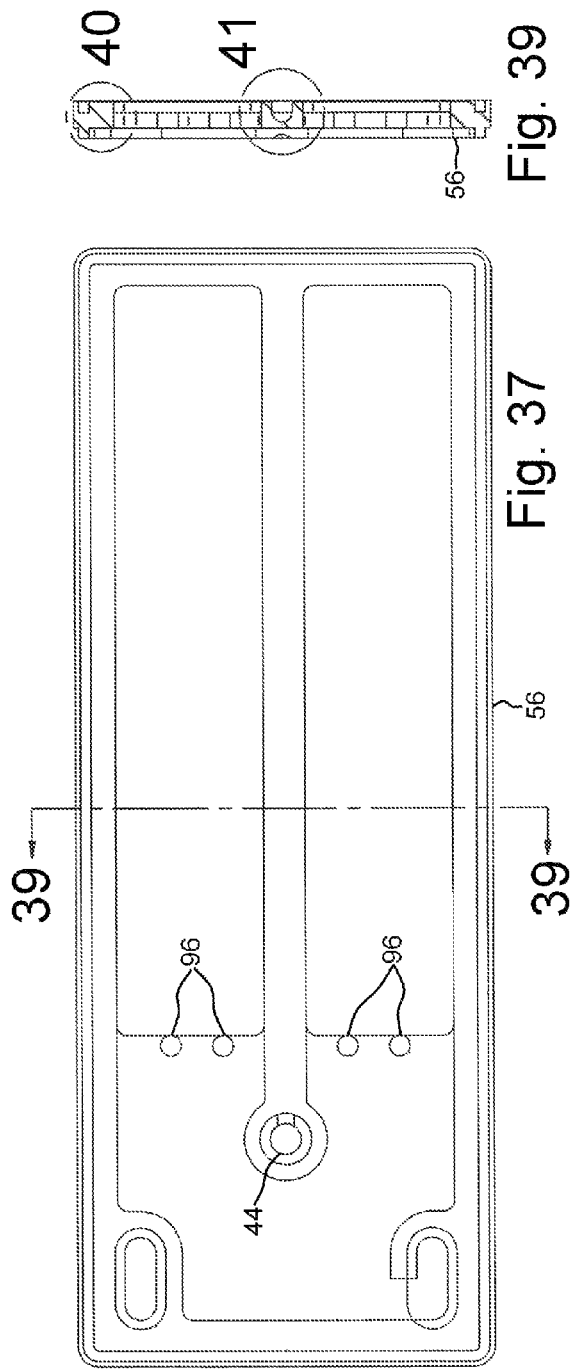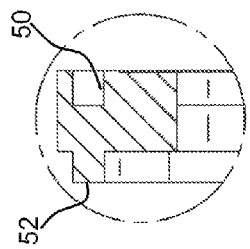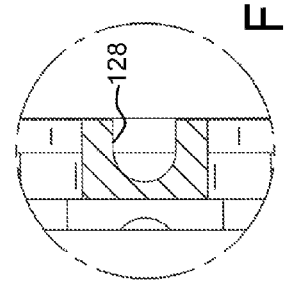

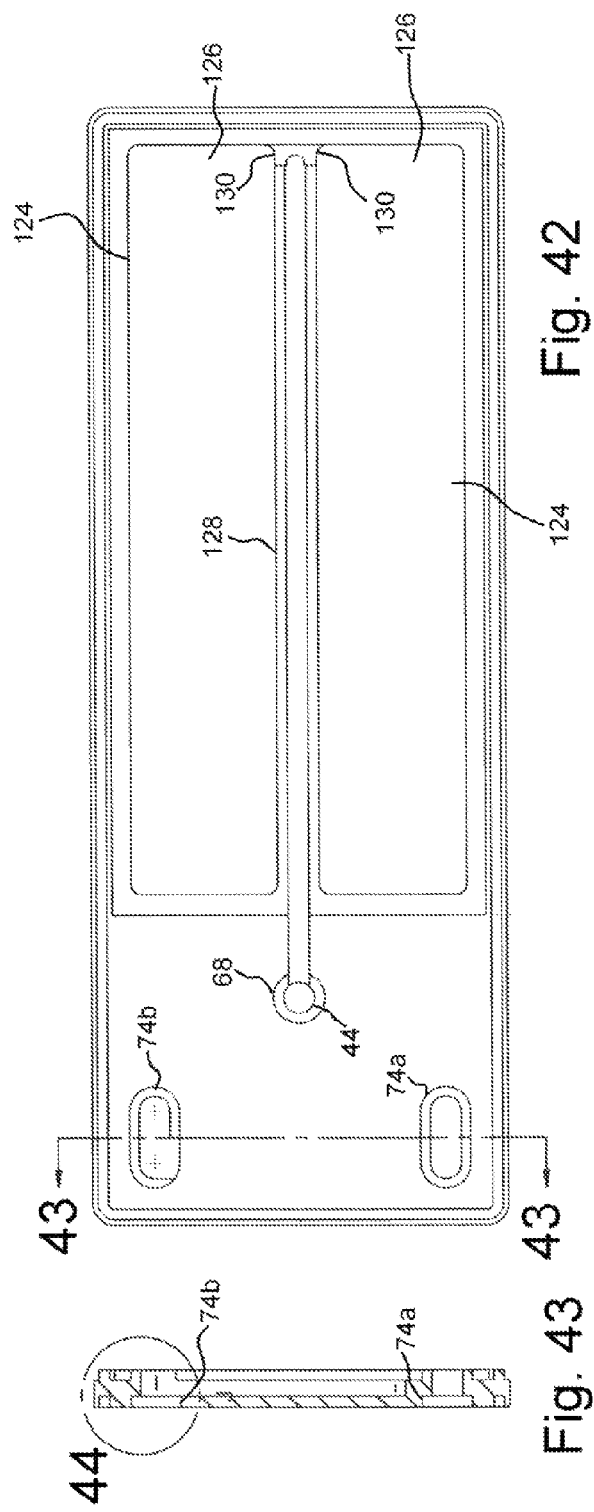

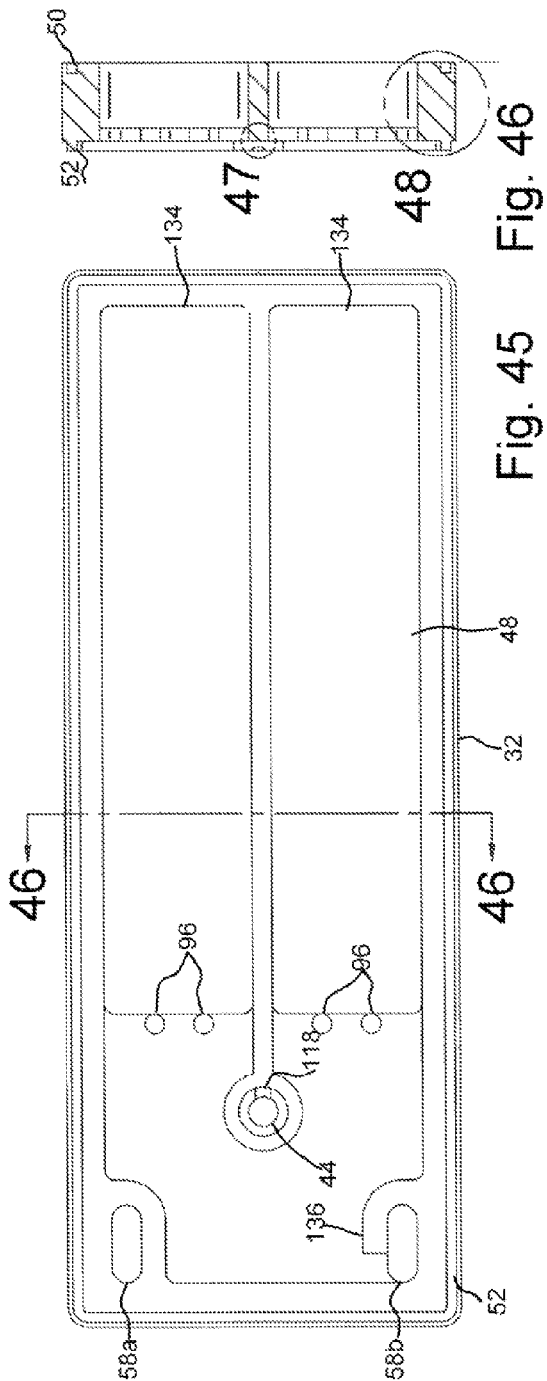
Fig. 45
Fig. 46
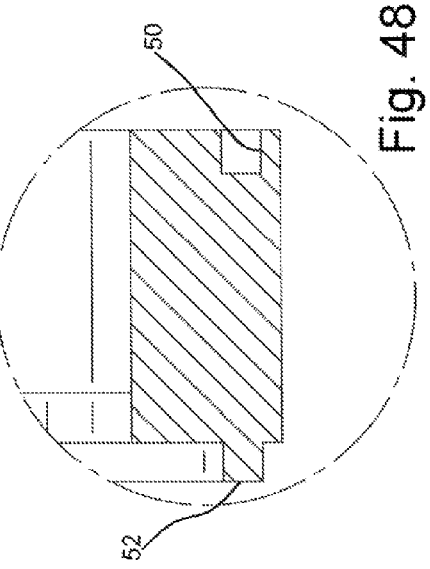
Fig. 47
Fig. 48

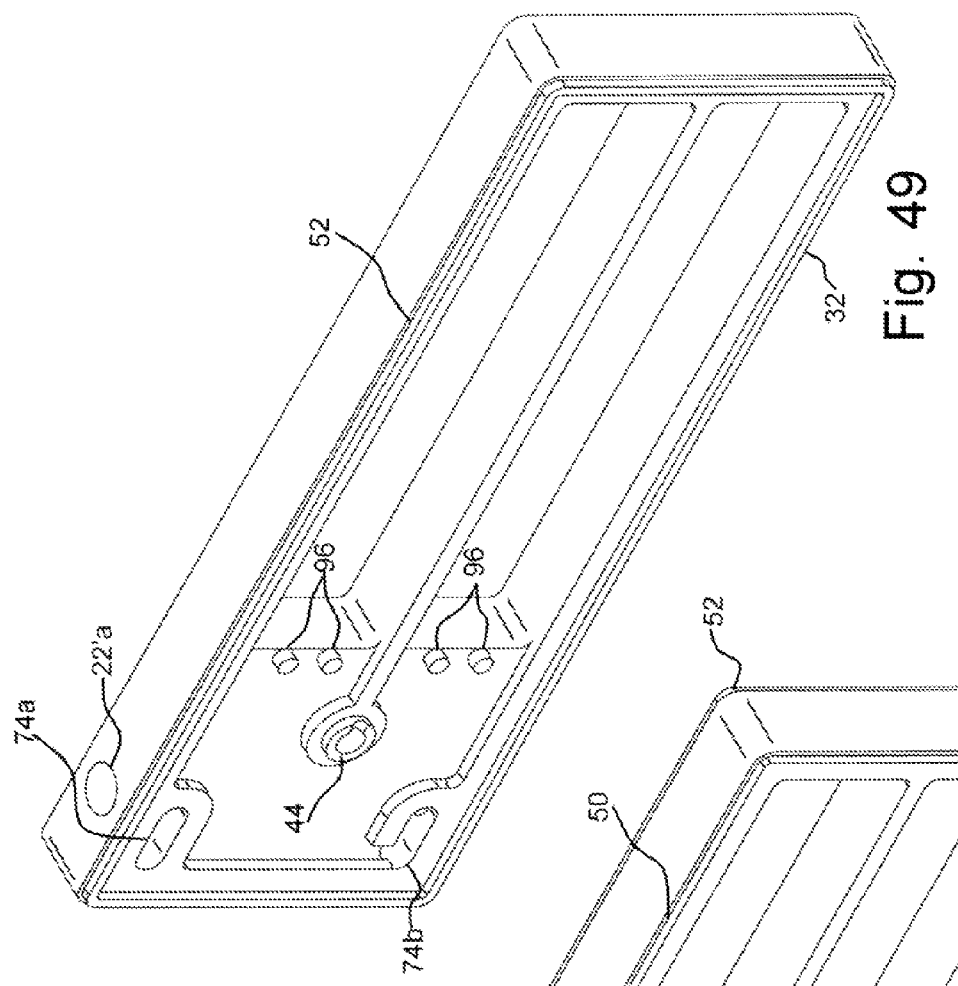
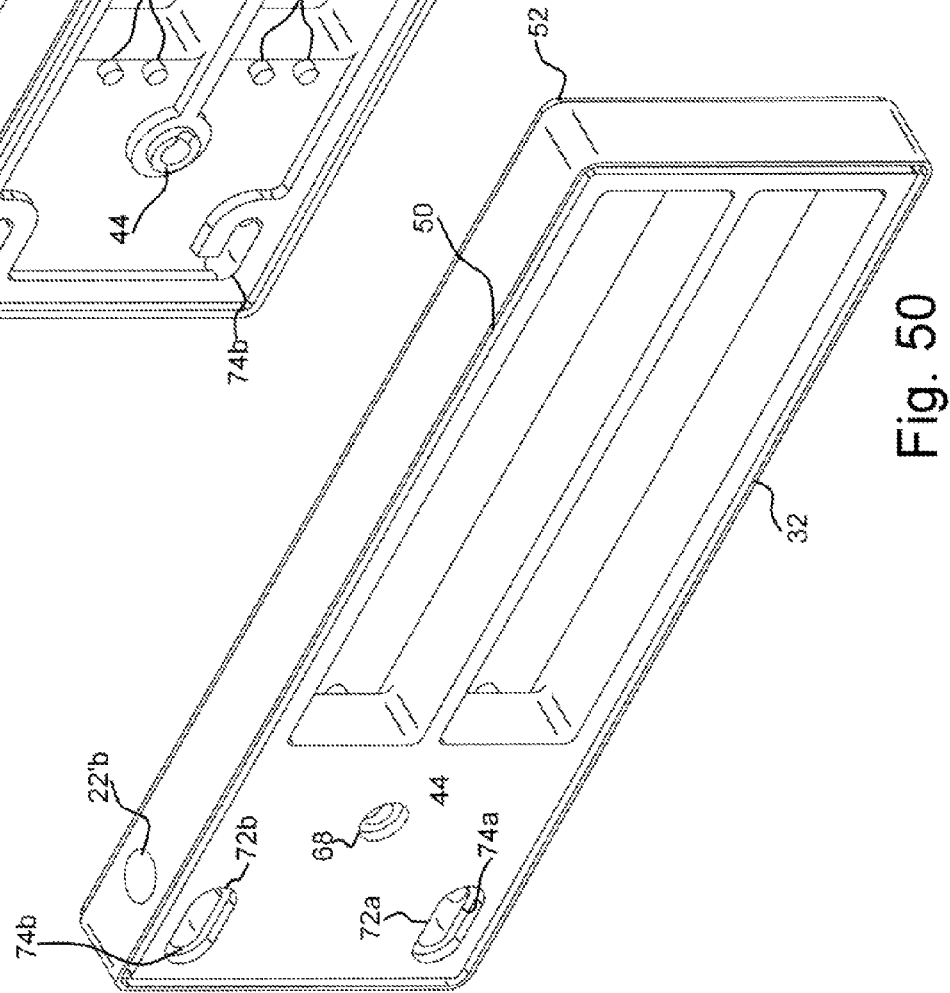

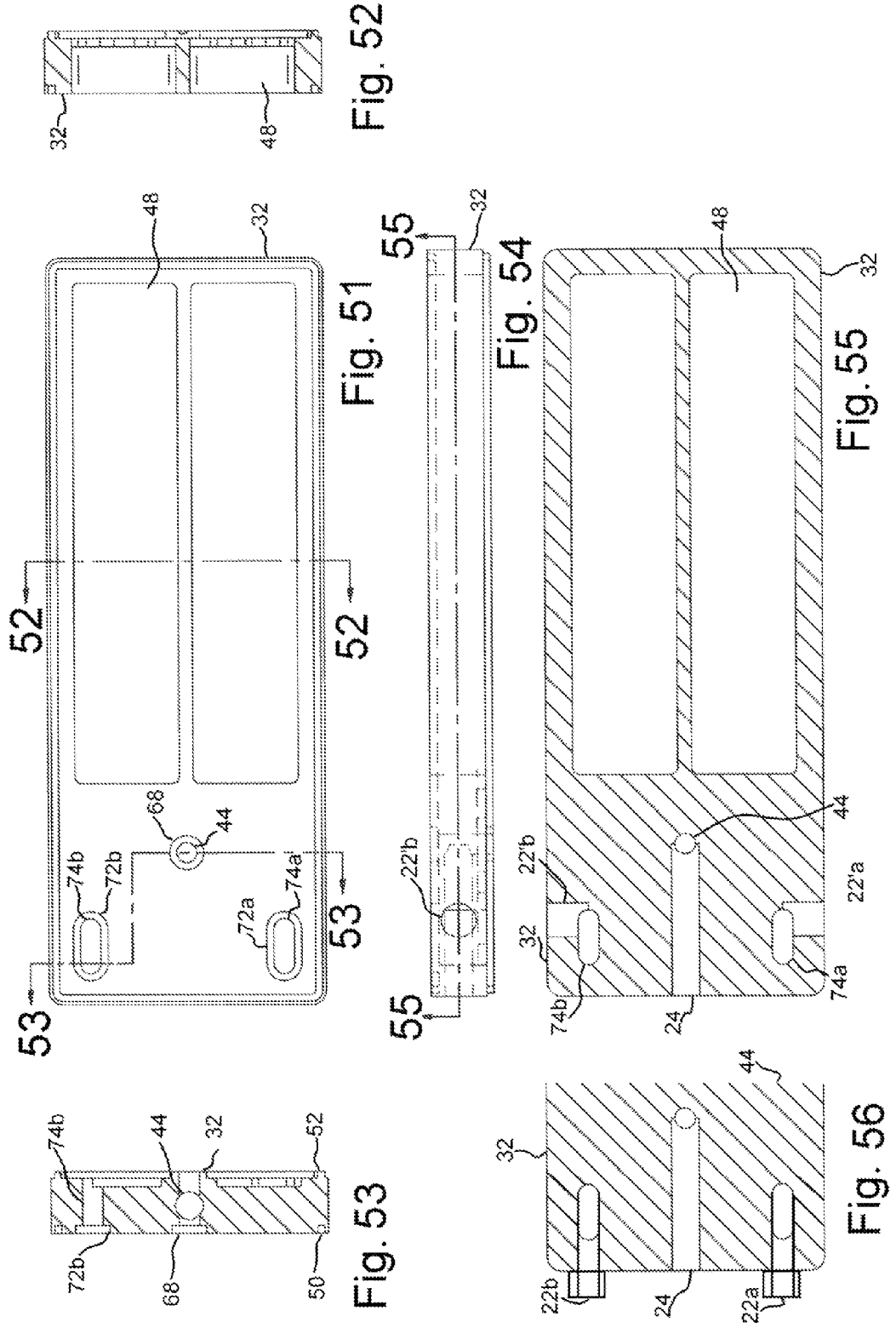

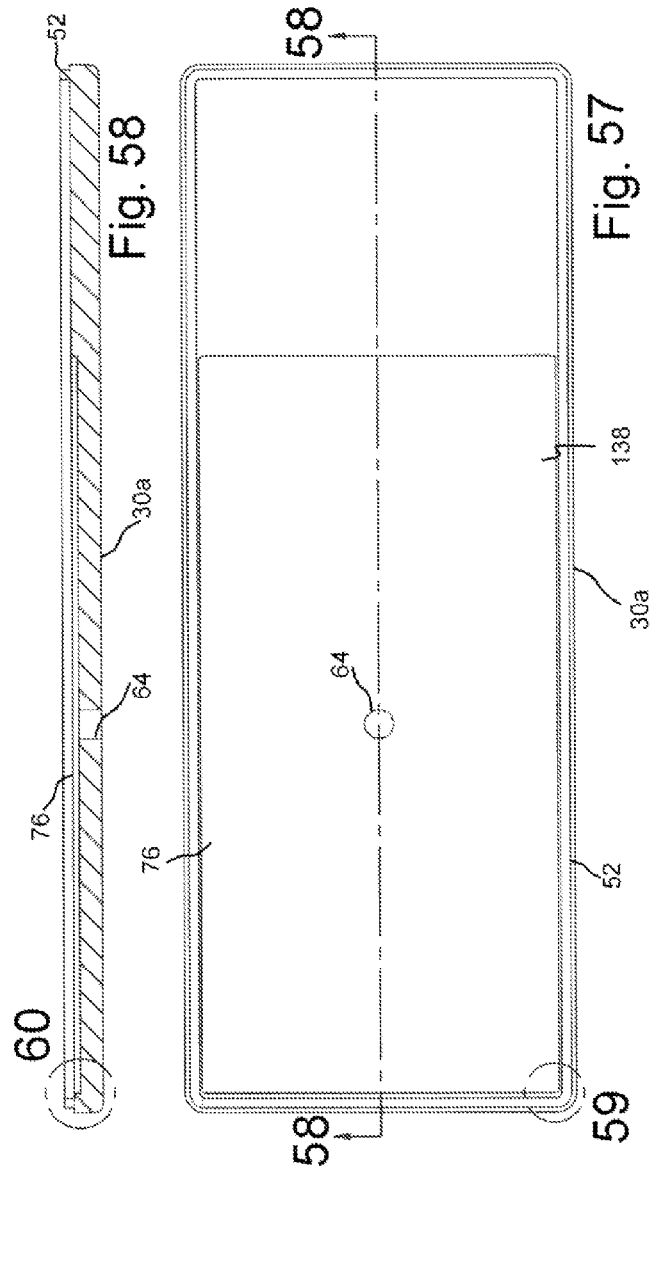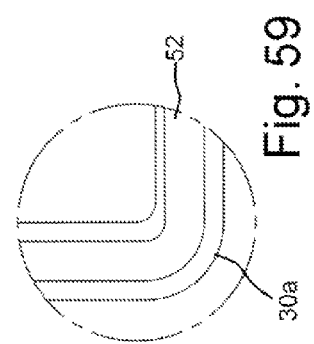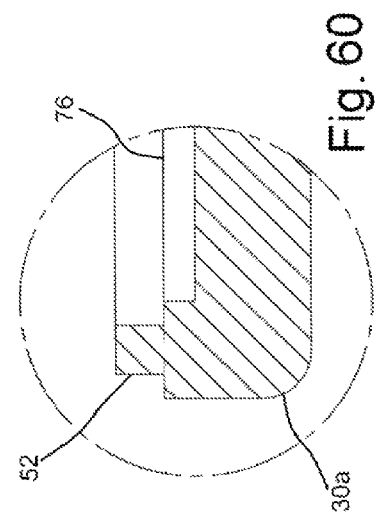

MODULAR ELECTROLYSIS UNIT

BACKGROUND OF THE DISCLOSURE

Field of the Disclosure

This disclosure relates to the field of electrolysis devices. A modular electrolysis unit is specifically disclosed comprising a plurality of interconnecting frames which may have an ion-permeable membrane, or a passive electrode attached and sealed thereto.

SUMMARY OF THE DISCLOSURE

A modular electrolysis system is disclosed herein comprising in one form: a female endplate, a plurality of membrane frames, a plurality of passive electrode frames, and a male endplate.

The female endplate in one example comprises; a first longitudinal side comprising in turn, a female alignment indent therein; and a female endplate electrode affixed to the first longitudinal side of the female endplate.

Each membrane frame in one form comprising; a first longitudinal side having a male alignment detent therein; a surface defining a first gas production chamber which extends longitudinally through the membrane frame; a surface defining a portion of an electrolyte distribution chamber extending longitudinally through the membrane frame and in fluid communication with the first gas production chamber; and a surface defining an electrolyte flow channel extending vertically downward from the electrolyte distribution chamber to a lower region of the first gas production chamber. The surface defining a portion of a first gas collection chamber extending longitudinally through the membrane frame wherein the first gas collection chamber is at an upward region of the first gas production chamber and the first gas collection chamber is in fluid communication with the first gas production chamber at an upper region of the first gas collection chamber. The membrane frame in one form also comprising a surface defining a second longitudinal side, which is in longitudinal opposition to the first longitudinal side of the membrane frame. The second longitudinal side in one form having a surface defining a female alignment detent intended to engage male alignment protrusion of an adjacent frame or endplate. A surface defining a portion of a second gas collection chamber extending longitudinally through the membrane frame wherein the second gas collection chamber passes longitudinally through an upward region of the first gas production chamber and the second gas collection chamber is not in fluid communication with the first gas production chamber; wherein one membrane frame is provided adjacent the female endplate such that the male alignment detent of the membrane frame fits within the female alignment detent of the adjacent female endplate Each electrode frame in one form comprising: a first longitudinal side having a male alignment detent therein; a surface defining a second gas production chamber which extends longitudinally through the electrode frame; a surface defining a portion of the electrolyte distribution chamber extending longitudinally through the electrode frame; and a surface defining a electrolyte flow channel extending from the electrolyte distribution chamber to a lower region of the second gas production chamber. The electrode frame may also comprise: a surface defining a second gas collection chamber extending longitudinally through the membrane frame, wherein the second gas collection chamber is at an upward region of the second gas production chamber and the second gas collection chamber is in fluid communication with the second gas production chamber. A surface defining a second longitudinal side of the electrode frame may also be provided, in longitudinal opposition to the first longitudinal side having a surface defining a female alignment detent. At least one electrode frame is provided adjacent a membrane frame such that the male alignment detent of the electrode frame fits within the female alignment detent of the adjacent membrane frame.

The male endplate in one form comprising; a first longitudinal side comprising a male alignment detent therein; a male endplate electrode; wherein the male alignment detent of the male endplate fits within the female alignment detent of an adjacent membrane frame; and wherein another membrane frame is provided adjacent the male endplate such that the female alignment detent of the membrane frame is received within the female alignment detent of the adjacent male endplate.

The disclosed modular electrolysis system as recited herein may further comprise a casing wherein the casing houses, protects, and holds in position each of the female endplate, membrane frame(s), electrode frame(s), and male endplate.

The modular electrolysis system as recited herein may further include a manifold frame comprising: a first longitudinal side having a male alignment detent therein which fits within the female alignment detent of an adjacent electrode or membrane frame. Also disclosed is a surface defining a portion of the electrolyte distribution chamber extending longitudinally through the membrane frame and in fluid communication with the gas production chamber. Also disclosed is an embodiment wherein a surface defining a portion of the first gas collection chamber extends longitudinally through the manifold frame and a surface defining a portion of the second gas collection chamber extends longitudinally through the membrane frame. The manifold frame may also comprise a surface defining a gas production chamber, wherein either the first gas collection chamber or the second gas collection chamber is in fluid communication with the gas production chamber at an upper region of the first or second gas collection chamber. The manifold frame may also utilize a surface defining a first gas outlet port which is in fluid communication with the first gas collection chamber; as well as a surface defining a second gas outlet port in fluid communication with the second gas collection chamber; and a surface defining an electrolyte fluid input port in fluid communication with the electrolyte distribution chamber. The manifold frame may also have a second longitudinal side having a female alignment detent therein which receives the male alignment detent of an adjacent membrane or electrode frame.

The disclosed modular electrolysis system in one form also comprises a first endplate which in turn comprises: a first longitudinal side; and a first endplate electrode. The system also comprising a plurality of membrane frames, each membrane frame comprising; a first longitudinal side; a surface defining a first gas production chamber which extends longitudinally through the membrane frame; a surface defining a portion of an electrolyte distribution chamber extending longitudinally through the membrane frame; and a surface defining a portion of a first gas collection chamber which extends longitudinally through the membrane frame. In one form, the first gas collection chamber is at an upward region of the first gas production chamber, and the first gas collection chamber is in fluid communication with the first gas production chamber. The first endplate also comprising in one example: a surface defining a second longitudinal side; and a surface defining a second gas collection chamber extending longitudinally through the membrane frame wherein the second gas collection chamber passes longitudinally through the first gas production chamber and the second gas collection chamber is not in fluid communication with the first gas production chamber.

In one form, one of the membrane frames is provided adjacent the first endplate.

Also, at least one passive electrode frame may comprise: a first longitudinal side which is adjacent one of the membrane frames; a surface defining a second gas production chamber which extends longitudinally through the passive electrode frame; a surface defining a portion of the electrolyte distribution chamber extending longitudinally through the membrane frame; a surface defining a electrolyte flow channel extending vertically from the electrolyte distribution to a lower region of the first gas producing chamber; and a surface defining a second gas collection chamber which extends longitudinally through the membrane frame wherein the second gas collection chamber is at an upward region of the second gas production chamber and the second gas collection chamber is in fluid communication with the second gas production chamber. The passive electrode frame may also comprise a surface defining a second longitudinal side.

The system may utilize a second endplate longitudinally in opposition the first endplate. The second endplate comprising; a first longitudinal side; a second endplate electrode; and wherein one membrane frame is provided adjacent the second endplate.

The modular electrolysis system as disclosed above may further comprise a manifold frame having: a first longitudinal side in contact with an adjacent electrode or membrane frame; and a surface defining a portion of the electrolyte distribution chamber extending longitudinally through the membrane frame and in fluid communication with the gas production chamber. The manifold frame may utilize a surface defining a portion of the first gas collection chamber extending longitudinally through the manifold frame; a surface defining a portion of the second gas collection chamber extending longitudinally through the membrane frame; and a surface defining a gas production chamber, wherein either the first gas collection chamber or the second gas collection chamber is in fluid communication with the gas production chamber at an upper region of the first or second gas collection chamber. For inflow and outflow of the produced gasses and electrolyte fluids, the system may include a surface defining a first gas outlet port in fluid communication with the first gas collection chamber; a surface defining a second gas outlet port in fluid communication with the second gas collection chamber; and a surface defining an electrolyte fluid input port in fluid communication with the electrolyte distribution chamber. The manifold frame may also have a second longitudinal side which is in contact with an adjacent membrane or electrode frame.

The modular electrolysis system as disclosed may be arranged wherein a transverse width of each gas production chamber is substantially less than a vertical height of each gas production chamber.

The modular electrolysis system as disclosed may be provided with an electrolyte flow channel wherein the electrolyte flow channel transversely divides the gas production chamber into sub chambers which are fluidly isolated between a lower end of the electrolyte flow channel and an upper end of the electrolyte flow channel.

The modular electrolysis system may be arranged wherein the transverse dimension of each gas production chamber is substantially less than the vertical dimension of each gas production chamber. In one more specific range, the transverse dimension of each gas production chamber is less than 20% of the vertical dimension of each gas production chamber.

To increase productivity, the modular electrolysis system may incorporate a cooling water bath wherein the first endplate, electrode frames, membrane frames, and second endplate are substantially immersed in the cooling bath during operation of the system.

BRIEF DESCRIPTION OF THE DRAWINGS

FIG. 1 is a front isometric view of the disclosed apparatus.

FIG. 8 is a front (longitudinal) face view of an endplate component of the apparatus shown in FIG. 1.

FIG. 9 is a side (transverse) cutaway view of the apparatus shown in FIG. 8 taken along line 9-9.

FIG. 10 is a detail view of the region 10 of FIG. 9.

FIG. 11 is a detail view of the region 11 of FIG. 9.

FIG. 12 is an isometric view of a membrane frame component of the apparatus shown in FIG. 1.

FIG. 13 is an isometric view of the apparatus shown in FIG. 12 generally showing the opposing longitudinal side.

FIG. 14 is a detail view of the region 14 of FIG. 12.

FIG. 15 is a detail view of the region 15 of FIG. 12.

FIG. 16 is a detail view of the region 16 of FIG. 12.

FIG. 17 is a detail view of the region 17 of FIG. 13.

FIG. 18 is a detail view of the region 14 of FIG. 13.

FIG. 19 is a front (longitudinal) face view of the membrane frame component shown in FIG. 12.

FIG. 20 is a side (transverse) cutaway view of the component shown in FIG. 19 taken along line 20-20.

FIG. 21 is a top (vertical) cutaway view of the component shown in FIG. 19 taken along line 21-21.

FIG. 22 is a detail view of the region 22 of FIG. 21.

FIG. 23 is a detail view of the region 23 of FIG. 20.

FIG. 24 is a detail view of the region 24 of FIG. 20.

FIG. 25 is a rear (longitudinal) face view of the membrane frame component shown in FIG. 19 from the opposing longitudinal side.

FIG. 26 is a side (transverse) view of the membrane frame component shown in FIG. 25.

FIG. 27 is a side (transverse) cutaway view of the component shown in FIG. 25 taken along line 27-27.

FIG. 28 is a detail view of the region 28 of FIG. 27.

FIG. 29 is a detail view of the region 29 of FIG. 27.

FIG. 30 is an isometric view of a electrode frame component of the apparatus shown in FIG. 1.

FIG. 31 is an isometric view of the apparatus shown in FIG. 30 generally showing the opposing longitudinal side.

FIG. 32 is a detail view of the region 32 of FIG. 30.

FIG. 33 is a detail view of the region 33 of FIG. 30.
FIG. 34 is a detail view of the region 34 of FIG. 30.
FIG. 35 is a detail view of the region 35 of FIG. 31.
FIG. 36 is a detail view of the region 36 of FIG. 31.
FIG. 37 is a front (longitudinal) face view of the electrode frame component shown in FIG. 30.
FIG. 38 is a side (transverse) view of the electrode frame component shown in FIG. 30.
FIG. 39 is a top (vertical) cutaway view of the electrode frame component taken along line 39-39 of FIG. 37.
FIG. 40 is a detail view of the region 40 of FIG. 39.
FIG. 41 is a detail view of the region 41 of FIG. 39.
FIG. 42 is a front (longitudinal) face view of the electrode frame component shown in FIG. 30.
FIG. 43 is a top (vertical) cutaway view of the component of FIG. 42 taken along line 43-43.
FIG. 44 is a detail view of the region 44 of FIG. 43.
FIG. 45 is a front (longitudinal) face view of a manifold frame component.
FIG. 46 is a top (vertical) cutaway view of the component of FIG. 45 taken along line 46-46.
FIG. 47 is a detail view of the region 47 of FIG. 46.
FIG. 48 is a detail view of the region 48 of FIG. 46.
FIG. 49 is an isometric rear view of the component shown in FIG. 45.
FIG. 50 is an isometric front view of the component shown in FIG. 45.
FIG. 51 is a front (longitudinal) view of the component shown in FIG. 45.
FIG. 52 is a top (vertical) cutaway view of the component shown in FIG. 51 taken along line 52-52.
FIG. 53 is a top (vertical) cutaway view of the component shown in FIG. 51 taken along line 53-53.
FIG. 54 is a side (transverse) view of the component shown in FIG. 51.
FIG. 55 is a front (longitudinal) cutaway view of the component shown in FIG. 55 taken along line 55-55.
FIG. 56 is an alternate configuration a portion of the component shown in FIG. 55.
FIG. 57 is a front (longitudinal) view of another endplate.
FIG. 58 is a side (transverse) cutaway view of the component shown in FIG. 57 taken along line 58-58.
FIG. 59 is a detail view of the region 59 of FIG. 57.
FIG. 60 is a detail view of the region 60 of FIG. 58.

DESCRIPTION OF THE PREFERRED EMBODIMENTS

Figure 2:
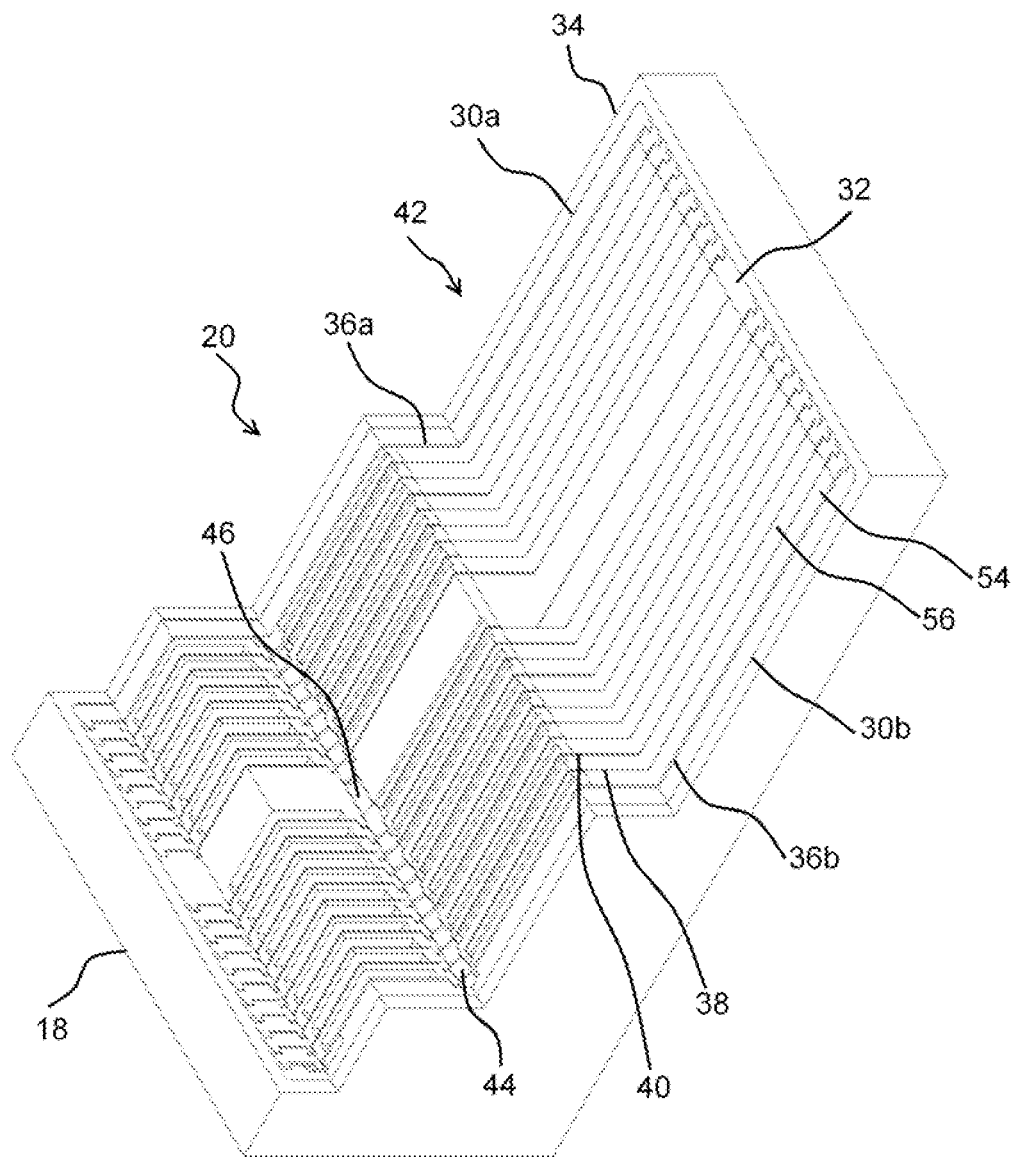
FIG. 2 is an isometric stepped cutaway view of the apparatus shown in FIG. 1.

Disclosed herein is a modular electrolysis system for the converting of a electrolyte fluid to disassociated gases. In particular, the system provides for an apparatus that disassociates water into hydrogen and oxygen gases. The system utilizes electric energy in a process commonly known as the "electrolysis of water".

As the system is generally modular, the components may be longitudinally "stacked" in differing configurations for different applications. For example, a module consisting of 10 cells, may have a volume of 1080 cm$^3$, with dimensions of 10×6×18 cm, and may have an over all weight (when devoid of an electrolyte fluid) of approximately 2 kg. Custom units may contain any number of cells. Units may for example have a single cell, or may comprise 20 or more cells. In addition, the assembled modules may be connected in various serial and or parallel configurations.

In one form, a single cell may operate at around 3.1 V at 20° C. and may operate at 2.2 V at 60° C. to deliver 13 A of current. Such a unit may operate in the temperature range from 5° C. to 60° C. Nominal current may be 13 A and in one example the maximum current may be 15 A. The modular system may comprise protective circuitry and or systems for example wherein exceeding the maximum operating current or temperature will trigger an over current and/or temperature protective system.

In one example, Nickel (Ni) coated electrodes may be used, reducing the operating voltage in some applications. In the example operating at 3.1V/2.2V, using Ni coated electrodes may reduce the operating voltages at the same temperatures to 2.7V/1.8V respectively. It is also conceived that utilizing Ni coated electrodes may allow for a reduction in the physical size of the system without a reduction in performance.

It is also disclosed that in some applications, it may be desired to immerse (or partially immerse) the system in a cooling water bath to maintain uniform temperature of the unit and to extract heat from the system. Extraction of heat may be critical in some applications where heat recovery and energy management are focal points of the system design.

The volumetric flow of produced gases (hydrogen and oxygen) generally is a function of the number of cells and the electric current flow through each cell. Maximum volume of hydrogen produced for example from a 10-so module was tested at 1 L/min. to estimate volumetric flow in liters per minute the following formula can be used: V $$(L/min)=6.96\times 10(3)\times I\times N$$

I—current [A], N—number of cells in module

A 10-cell module in one configuration may operate on 0.5 L of 22% wt concentration of potassium hydroxide (KOH). To maximize performance of the module, the concentration of KOH can be increased to 32% wt. The electrolyte supplies water for the electrolysis and extracts heat from the module. Minimum volumetric flow of the electrolyte depends on the operating conditions, but should be in the range of 0.2 to 0.5 L/min.

Other designs are conceived, such as a design with lower L/A cell geometry ratio, operating at 34% wt concentration of KOH and at temperatures above 70° C. Based on current test results and calculations of similar designs, such a unit may have a very significant performance improvements compared to other designs. In some applications, the maximum allowable temperature of the membrane is the primary challenge of such design.

Before continuing a detailed description, an axes system 10 is shown in FIG. 1 generally comprising a vertical axis 12, a longitudinal axis 14 and a transverse axes 16. While several of the figures may show the apparatus "lying on its side" (FIG. 4 for example) this orientation of the drawing(s) is to abbreviate the space required and is not intended to limit the disclosure. Looking for example, to FIG. 12, it can be seen that when the top 18 of the apparatus is in the vertical upward position, the overall system will operate as intended and will generally not operate in other orientations.

In addition, an alphanumeric labeling system is utilized wherein a generic component will have a numeric identifier and wherein any specific embodiment of such a generic component will have an alphabetic suffix attached to the numeric identifier. For example, electrode posts 26 are specifically identified in FIG. 1 as electrode posts 26a and 26b.

Looking back to FIG. 1, it can be seen how the modular electrolysis system 20 has on its exterior thereof a plurality of gas outlets 22a and 22b for the extraction of resultant gases from the interior portion of the system 20. In addition, an electrolyzer fluid input 24 is provided for insertion of electrolyzer fluid during startup/initialization and/or to replace electrolyzer fluid which is consumed during operation of the system. In addition, a plurality of electrode terminal posts 26 are provided for attachment to an outside electric source and provide conductivity to electrode studs 28 which transferred to the interior of the assembly to provide a electric current to electrodes which will be described later. In FIG. 1, a plurality of end plates 30*a* and 30*b* are clearly shown and will be described in more detail. Additionally, a plurality of membrane frames 54, electrode frames 56, and a manifold frame 32 are shown. It is conceived that more than one manifold frame could be utilized in an assembled module (unit).

Looking to FIG. 2, the modular electrolysis system 20 in one configuration also comprises an outer casing 34 which generally surrounds and encases the components shown in FIG. 1 to protect the internal components and to hold the components in place relative to each other. Also shown in this stepped cutaway view are the end plates 30*a* and 30*b*. Of particular note, the top 18 of the system 20 is shown in an orientation different from to the orientation shown in FIG. 1 to more easily show the internal components from this angle. This view also provides a good view of internal endplate active electrodes 36*a* and 36*b* which in this configuration are provided on the end plates 30*a* and 30*b* respectively. Each of the active electrodes 36*a* and 36*b* in this configuration is electrically connected to the electrode terminal posts 26*a* and 26*b* through the electrode studs 28.

In the embodiment shown in FIG. 2, a plurality of membranes 38 and passive electrodes 40 are provided in the lower region 42 of the system 20 longitudinally between the electrodes 36*a* and 36*b* a similar series of membranes and passive electrodes is disclosed in co-pending U.S. patent application Ser. No. 11/942,356 incorporated herein by reference. While the longitudinal arrangement of a series of passive electrodes and ion permeable membranes is disclosed in the '356 application, the particular modular configuration disclosed and claimed herein his novel and deserves specific consideration.

Figure 3:
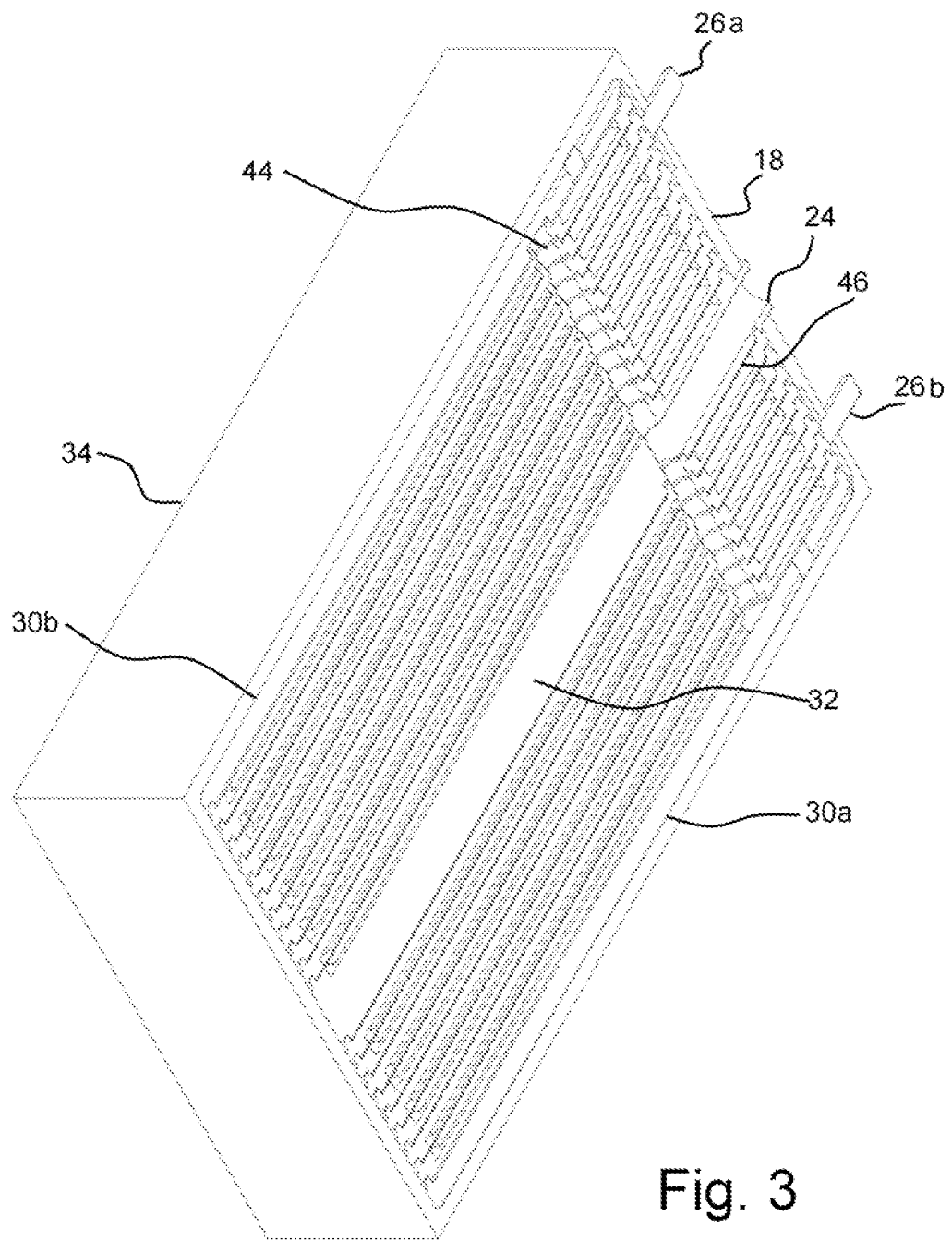
FIG. 3 is an isometric cutaway view of the apparatus shown in FIG. 1, taken from an angle substantially reversed from that of FIG. 2, and with a different section cut.

Also shown in FIG. 2 is a distribution channel 44 which comprises an open region 46 more clearly shown in FIG. 3 as extending vertically upward to the electrolyzer fluid input 24. In this embodiment, by providing the electrolyzer fluid input 24 near the transverse and/or longitudinal center of the system, input fluids can more easily be distributed. In one configuration, the manifold frame 32 is positioned at the longitudinal center of the system 20 flow of the electrolyzer fluid is more easily and more evenly distributed between each of the gas producing cells.

Figure 4:
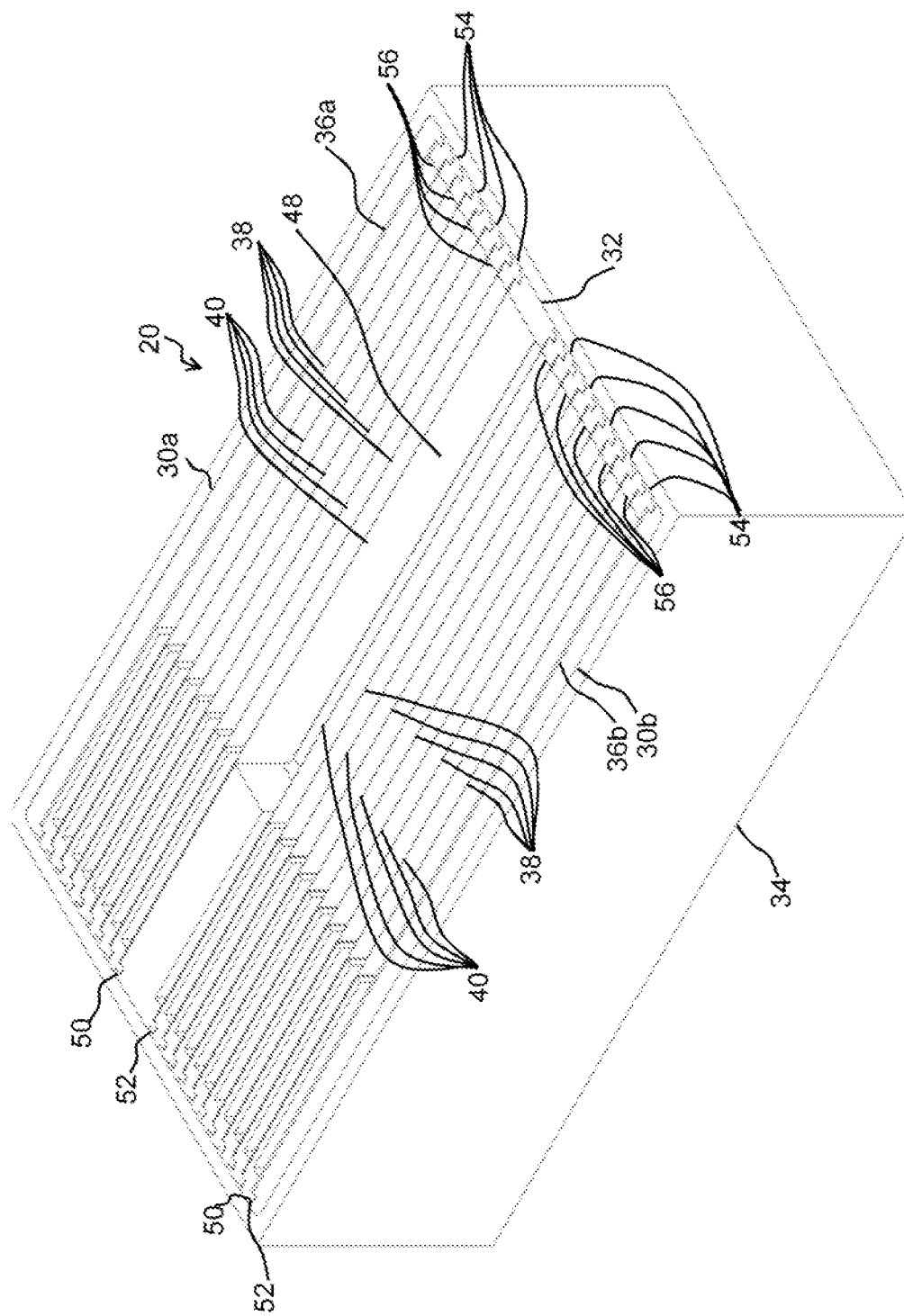
FIG. 4 is an isometric cutaway view of the embodiment of FIG. 1, with a different section cut from that shown in FIG. 3.

Looking to FIG. 4, the system 20 can be seen in another cutaway view at a transverse position where the lower portion of the manifold frame comprises an open region 48 providing ion and electric conduction between the gas producing chambers of each of the cells. In addition, the membranes 38 and passive electrodes 40 can much more easily be seen.

In particular, it can be seen how one configuration utilizes a series of electrodes 40 each with a membrane 38 presented between each adjacent electrode 40.

FIG. 4 also shows that in one configuration within the casing 34, all of the frames and end plates are held in place securely with a tongue and groove style arrangement. For example, the endplate 30*b* may comprise a female alignment indent 50 which receives a male alignment detent 52 of an adjacent component. The detent 52 and indent 50 may operate as a press fit, may be adhesively interconnected, may utilize a thermal connection such as a weld, or thermo-electric fitting such as those more commonly known in the field of plastic or PVC pipe connections. Alternatively, the indent 50 and detent 52 may utilize a snap fit connection. As the male alignment detent 52 and female alignment indent 50 of each frame member is substantially identical, the modularity of the overall apparatus is easily understood. For example, any number of membrane frames 54 and electrode frames 56 may be provided in the series between the end plates 30*a* and 30*b*.

Additionally, the manifold frame 32 may comprise a female alignment indent 50 on one longitudinal side and a male alignment detent 52 on the opposing longitudinal side for attachment between a plurality of frames such as adjacent electrode frame 56 and adjacent manifold frame 54.

Looking to FIG. 12, a membrane frame 54 is shown wherein the male alignment detent 52 extends around the perimeter of the membrane frame 54 so as to engage an adjacent frame or endplate to form a fluid tight seal thereto. Looking to FIG. 13, the same membrane frame 54 is shown wherein on the opposing longitudinal side a female alignment indent 50 is clearly shown again and forms a fluid tight seal to an adjacent frame or end plate. Similar structures can be seen in the electrode frame of FIGS. 30 and 31 as well as the manifold frame 32 of FIGS. 42 and 43.

Figure 5:
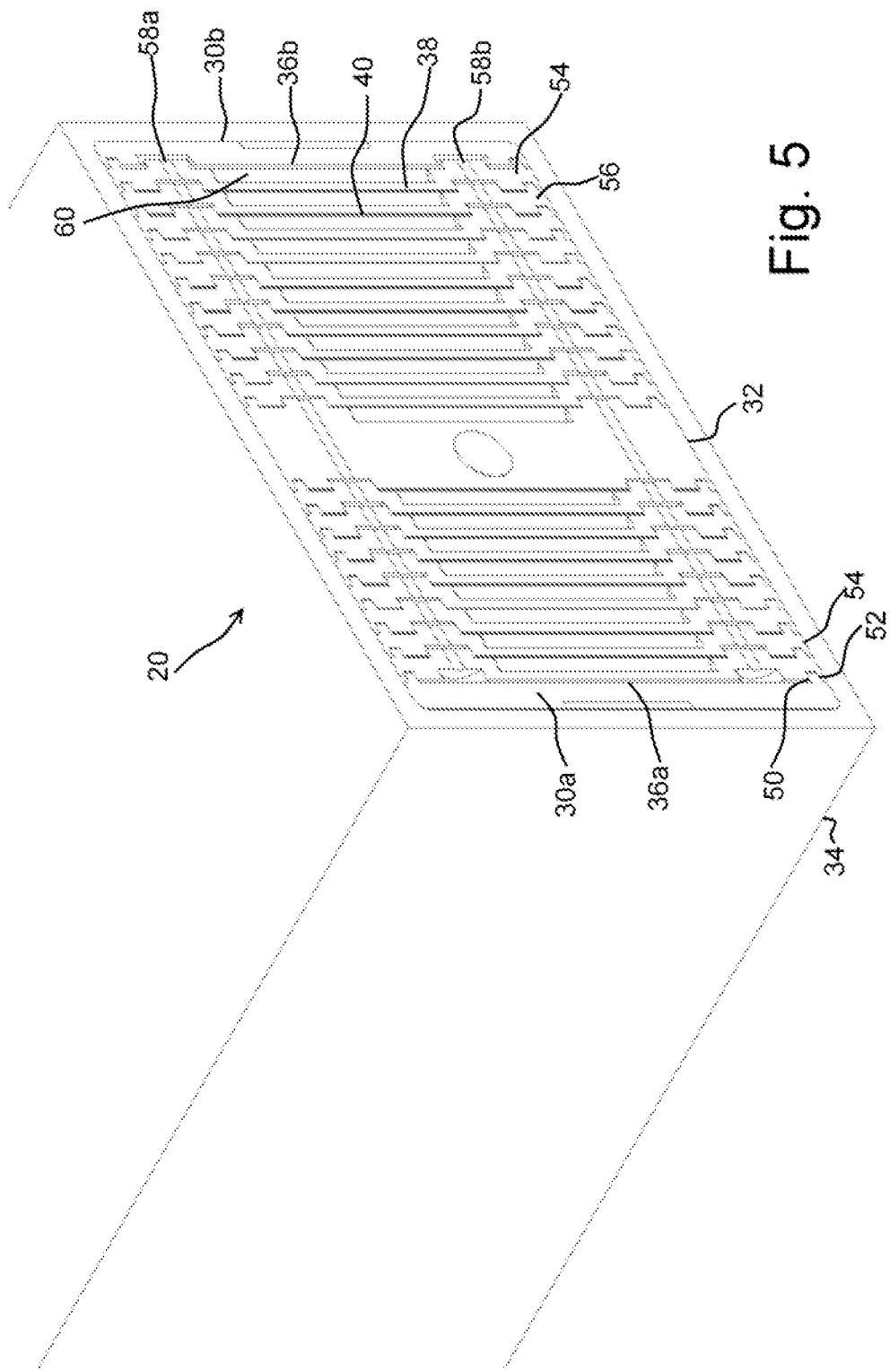
FIG. 5 is an isometric cutaway view of the apparatus shown in FIG. 1 with a different section cut orthogonal to the section cut shown in FIG. 4.

Looking to FIG. 5, many of these same components can be seen in a cross sectional view which is generally orthogonal to the view previously shown in FIG. 4. For example, the casing 34 and end plates 30*a* and 30*b* can be seen as well as the manifold frame 32. It can also be seen how the male endplate 30*a* comprises a male alignment detent 52 which engages a female indent 50 in the adjacent membrane frame 54. A first gas collection conduit 58*a* and a second gas collection conduit 58*b* are also shown in FIG. 5. As will be explained in more detail, each of the membrane frames 54 and electrode frames 56, as well as the end plates 30 and manifold frame 32, form the vertical and lateral sidewalls of a gas production chamber 60. Each membrane 38 and electrode, whether the electrode be an active electrode 36 or a passive electrode 40, forms longitudinal sidewalls of the same gas production chambers 60. Each gas production chamber 60 is fluidly connected at the uppermost portion to one of the first gas collection conduit 58*a* or second gas collection conduit 58*b* for removal of the produced gases from the system 20.

Figure 6:
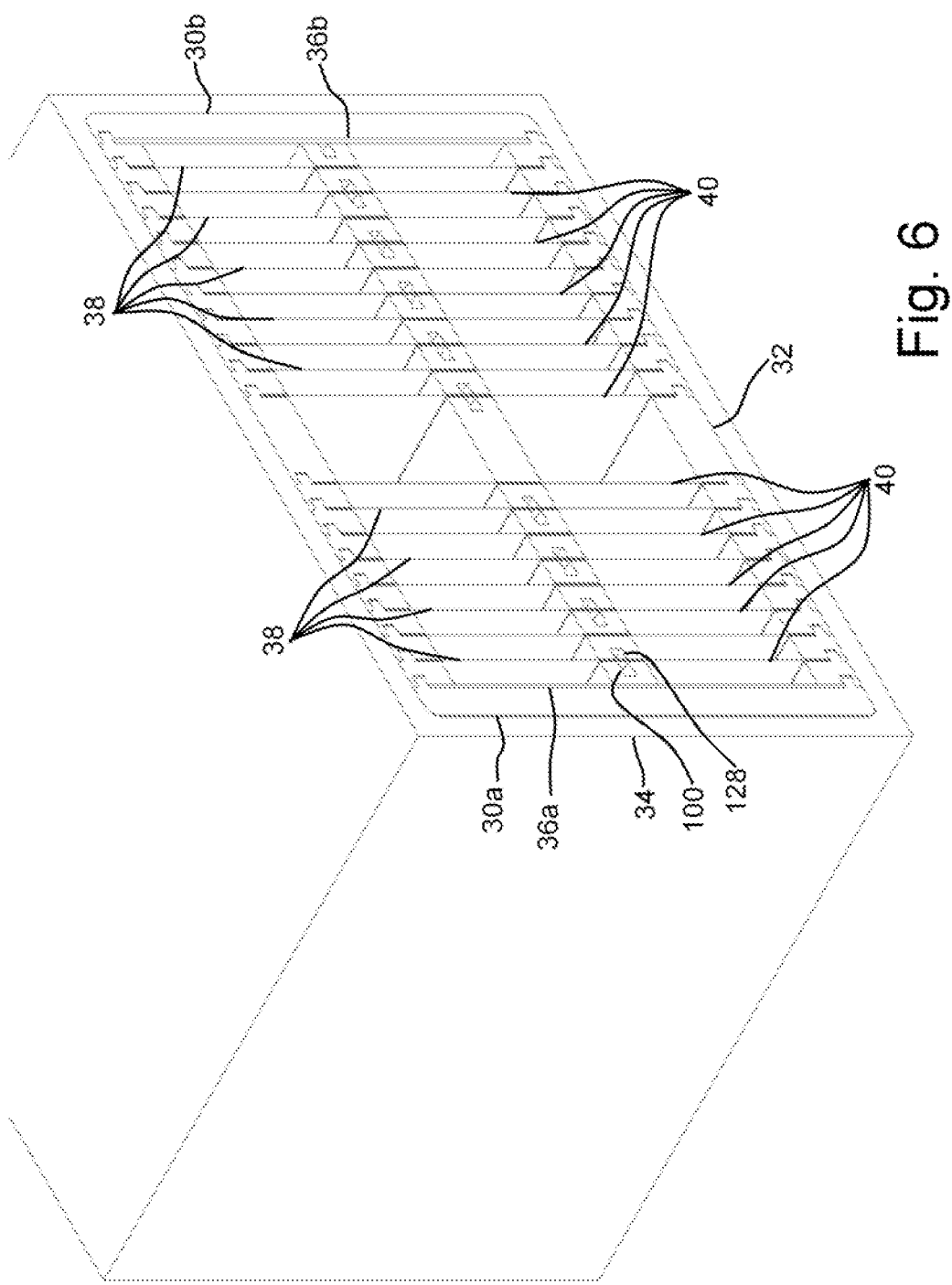
FIG. 6 is an isometric cutaway view of the apparatus shown in FIG. 1 with a section cut taken at a different vertical position from that shown in FIG. 5.

Looking to FIG. 6, it can be seen how a membrane 38 may be provided on one longitudinal side of the manifold frame 32, and an electrode 40 may be provided on the opposing longitudinal side. In this way, the alternating arrangement of membranes and electrodes can be maintained and the membrane frame can be utilized as half of an additional electrolysis cell.

In use, the active electrode 36*b* will be electrically connected to the electrode terminal post 26*b* and the active electrode 36*a* will be electrically connected to the electrode terminal post 26*a*. Depending on the direction of current flow through the apparatus, gas will be produced on either side of the electrodes 36 and 40 dependent upon the direction of current flow in that, for example, during the electrolysis of water, hydrogen gas will form on a first longitudinal side of each electrode and oxygen gas will form on the opposing longitudinal side of each electrode for each side between the facing sides of the active electrodes 36. Each of the gases will be collected using portions of the apparatus as will be disclosed herein in more detail.

Figure 7:
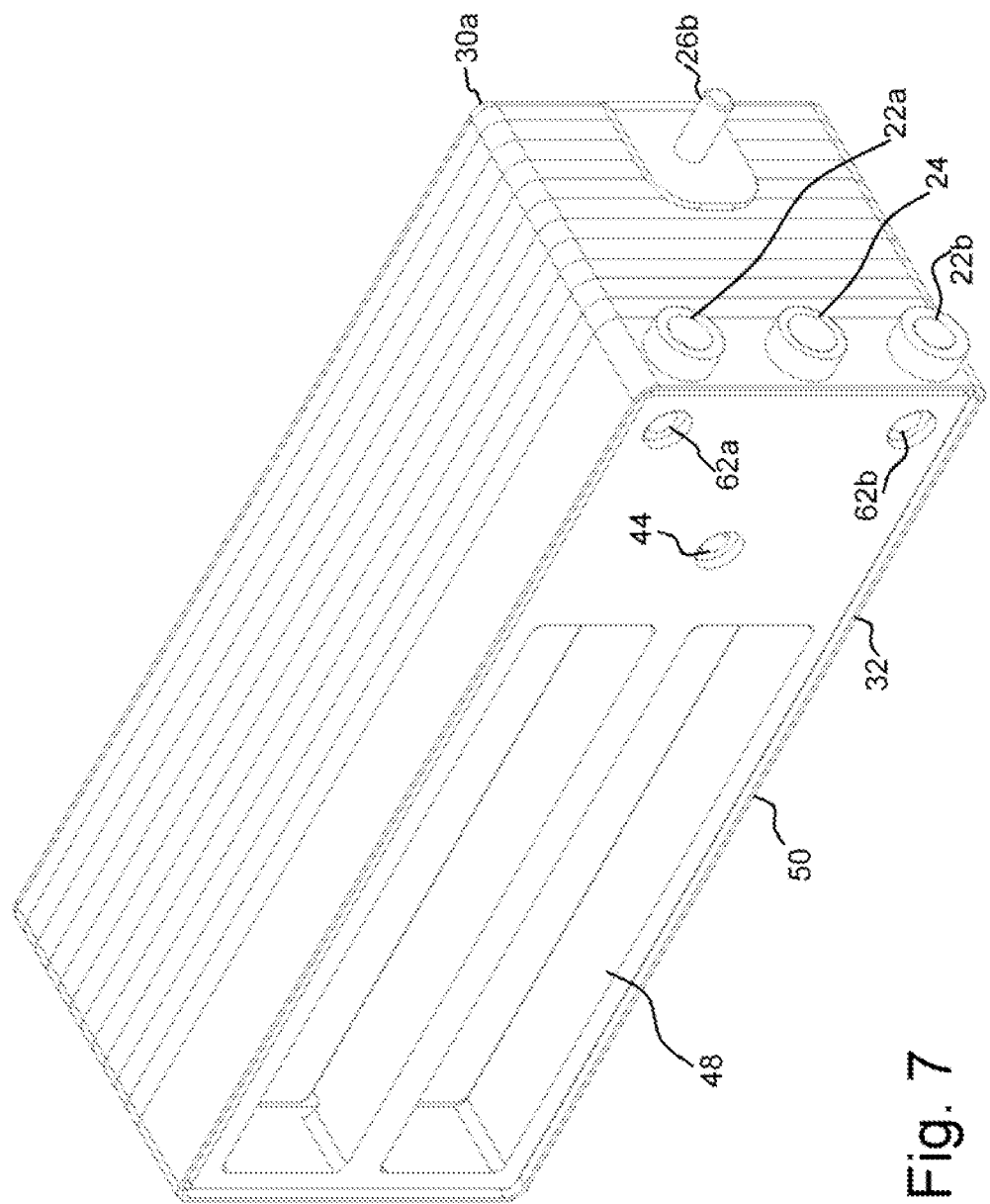
FIG. 7, is an isometric cutaway view of the apparatus shown in FIG. 1 with several components removed to show the internal structure of the apparatus.

Looking to FIG. 7, it can be seen in general how the electrolyzer fluid input 24 is in line vertically with the distribution channel 44. Similarly, it can be seen how the gas outlets 22*a* and 22*b* are vertically in-line with gas collection chambers 62*a* and 62*b* respectively. Further operation of these gas collection chambers will be defined in more detail. In addition, the alignment indent 50 of the manifold frame 32 can be easily seen.

FIGS. 8-11 show one configuration of the endplate 30*b* having an alignment indent 50 therein. As shown and previously described, this alignment detent 50 in this configuration is provided around the entire vertical and transverse perimeter of the inner face of the endplate. FIG. 9 shows a side cross-sectional view of this same component taken along line 9-9 of FIG. 8. This configuration also shows a surface defining a void 64 through which projects the electrode stud 28 previously shown in FIG. 1. In addition, a detent 76 may be provided in the first longitudinal side 66 for the insertion and placement of the endplate electrode 36b. In addition, a surface defining and indent 68 may be provided for receiving of a detent 70 extruding from a longitudinal face of the membrane frame 54 around the distribution channel 44. In one form, the indent 68 forms a sort of sealed end cap for the distribution channel 44. Surfaces defining indents 72a and 72b may be provided in a similar manner for receiving of detents 74a and 74b respectively. Detents 72a and 72b form portions of gas collection conduits 58a and 58b respectively as previously disclosed relative to FIG. 5. By utilizing the frames and end plates as the distribution channel 44 and gas collection chambers 74, the entire apparatus is truly modular and can be expanded to fit the desired size, shape and or output characteristics required.

FIGS. 12-18 show a membrane frame 54 comprising on the first longitudinal side 78 several components similar to those shown in the endplate 30b of FIG. 8-11 specifically, recesses 72 and 72b which open to gas collection conduits 58a and 58b respectively. In addition, an alignment indent 50 is also provided in the first longitudinal side 78. A membrane recess 80 which functions in a similar manner to the detent 76 is also disclosed. The membrane recess 80 provides a recessed portion of the membrane frame 54 for proper positioning and sealing of an adjacent membrane 38 not shown in these Figs. The membrane 38 may be attached and sealed to the membrane frame 54 by way of adhesives, thermal connection such as welding, press-fit, or otherwise attached. A gasket may also be used to enhance sealing of the membrane to example. A rib or protrusion 82 may also be provided to assist and alignment and proper positioning of the membrane. The rib 82 may also provide gaps 84 for better passage of gases between the gas production chamber(s) 85 and the associated gas collection conduit 58b. The manner in which these produced gas enter the associated gas collection conduit 50 8B will be more clearly understood once the arrangement of the adjacent electrode frame, endplate, or manifold frame is explained below. The first longitudinal side 78 of the membrane frame 54 may also comprise an indent 68 leading to a distribution channel 44 as more clearly understood by looking to FIG. 17.

FIG. 12 shows the membrane frame 54 from a second longitudinal side 86. This second longitudinal side in one configuration comprises an alignment detent 52 which functions as previously described. Additionally, the second longitudinal side 56 may comprise detents 74a and 74b which engage an adjacent indent on an electrode frame, manifold frame, or endplate as previously described. As the membrane frame 54 shown in FIG. 12 is open on the second longitudinal side 86 to the first gas conduit 50 8A, it can be seen how the detent 74a comprises a gap 88 for the passage of the produced gas. Looking to FIG. 25, with the understanding that this drawing shows the apparatus on its side, and where in operation the top side 18 would be in a vertically upward position, it can be seen how the gap 88 is provided at a vertically upper region 90 of the conduit 58a. Generally, the detent 74a and an adjacent portion 90 of the frame 54 assist in the removal of foam, bubbles, and other non-gaseous components from the produced gas. In particular, as the membrane 38 generally only extends vertically to the rib 82, which is generally adjacent and upper edge or side 92, forming the vertical upward limit of the gas production chamber 85, an upper region 94 is provided vertically above the upper edge of the membrane, and below the gap 88 so as to assist in the elimination of foam there between. In addition, the portion of the detent 74a and the portion 90 of the frame provide a vertical barrier such that any fluids or foam traveling vertically upward would engage and be deflected by these surfaces and would not have a direct line of access to the conduit 58a. In operation, due to the aggressive production of gases in a fluid environment, removal of all of the foam is often very difficult, as there is generally no clear demarcation between the pure fluid electrolyzer and the pure produced gas. However, by utilizing a gas production chamber(s) 85 which is substantially smaller in the transverse direction than in the vertical direction, and by providing a substantial upper region 94 with no fluid component therein, a substantial portion of the foam will return to a fluid state and "drop" back into the fluid electrolyzer within the gas production chamber 85 adjacent the membrane where it may then be electrolyzed. This is especially beneficial as many of the membranes require to be "wet" to allow passage of ions, and electric current, and not allow the passage of fluids or gasses.

FIG. 12 also shows a plurality of offset posts 96 which help to position the second longitudinal side 86 in relative position to the adjacent electrode frame, manifold frame, or endplate.

Looking again to FIG. 13, it can be seen how the gas production chamber 85 is divided into transverse cells by way of a vertically extending support 98. This support 98 divides the chamber 85 into transverse sub-chambers which further enhance the separation of foam from gas, and also provides one side of an electrolyte light flow channel 100 as seen in FIG. 12, looking to the detail view of FIG. 15, it can be seen how the detent 70 and adjacent protrusion 102 surrounding the distribution channel 44 may include a gap 104 which is aligned with protrusions 106. The protrusions 106 in combination with other surfaces of the support 98 form several sides of the electrolyte flow channel 100. This makes the device relatively easy to produce, as it is easily cast from a simple mold with no undercuts. The open side of the electrolyte flow channel 100 is generally enclosed when it is in sealing contact with an electrode surface on an adjacent electrode frame, endplate, or manifold frame. Again, adhesives, gaskets or other connection means can be utilized to seal the faces 108 of the protrusions 106 to the adjacent electrode surface.

The electrolyte flow channel 100 provides a conduit for the addition of replacement or electrolyte fluids from the distribution channel 44 to the lowermost region 110 of the gas production chamber 85. This overall assembly is more easily understood by looking to FIG. 25, specifically the cutaway view shown in FIG. 27 and especially the cutaway detail view of FIG. 29. Looking back to FIG. 25 it can be seen how at the lowermost edge 112 of the electrolyte flow channel 100, a plurality of gaps 114 are provided transversely to allow the electrolyte to flow transversely outward from the electrolyte flow channel 100 into the gas production chamber(s) 85. As it may in some applications be difficult to properly size and seal the electrolyte flow channel 100, a tube may be provided therein and sealed in fluid communication with the distribution channel 44.

Looking to the electrode frame 56 shown in FIGS. 3-44 many of the same components can be seen as were previously described relative to the membrane frame 54. In particular, protrusions 52 and 96 are provided as well as an outline meant the detent 52 and alignment detent 50 previously discussed in detail. In addition, the distribution channel 44 is also shown as well as a detent 116 which functions in a similar manner to the detent 70 of FIG. 15. One significant difference is that only a small cutout 118 of the detent 116 forms a portion of the electrolyte flow channel 100 which is generally not provided in the second longitudinal side 120 but is rather provided in the first longitudinal side 122 as will be described. Also, it can be seen how the first gas conduit 58a is not open to the second longitudinal side 120 of the electrode frame 56, but rather, the second gas collection chamber 58b is open thereto in a manner equivalent to that described in detail above relative to the detent 70 4B and the gap adjacent thereto. As the gas production chamber(s) 124 are separated from adjacent gas production chamber's 85 by way of a passive electrode on one side and a ion permeable membrane on the other side, it is understood how alternate gas production chambers are open to opposing gas collection chamber's 58a/58b as each of the alternate gas production chambers produce separate gases and is generally non-advantageous in some applications dangerous to recombine these gases in an uncontrolled environment. Looking specifically to FIG. 31, it can be seen how a flow channel 128 extends vertically downward from the distribution channel 44 to a lower region 126 of the gas production chamber(s) 124 in a manner similar to that is disclosed above. However, as on the first longitudinal side 122 an indent 68 is provided instead of the detent 116 provided on the opposing side, the flow channel 128 is a roof provided in the support 130 rather than the plurality of protrusions 106 disclosed relative to FIG. 15. Although the effect is the same and it is relatively a matter of semantics and description rather than actual production distinguishing characteristics.

Looking to FIG. 42, it can be seen again how at the lower region 126 of the gas production chamber(s) 124 the flow channel 128 is open transversely via gaps 132 allow for distribution of the electrolyte fluid evenly and consistently into the lower region 126 of the gas production chamber(s) 124.

As previously explained, a series of membrane frames 54 and electrode frames 56 may be connected in series with an endplate on either end to form an electrolyte cell or unit, each with a membrane or passive electrode positioned there between. On either end, adjacent the endplate, and active or electrically powered electrode would normally be positioned.

As previously discussed, a manifold frame 32 may also be implemented as briefly described relative to FIGS. 1, 6, and 7 and others. A more detailed view of one particular manifold frame 32 in two different configurations is shown in FIGS. 45-55. Many of the same components can be seen as were previously discussed relative to either the electrode frame 56 or membrane frame 54. In particular, protrusions 96 can be seen with the same function as described before, as well as an alignment detent 52 and alignment indent 50. Also, the gas collection chamber 58b is open to the gas production chambers 134. As with previous frames, a surface 136 may be provided to deflect a substantial portion of the foam, bubbles, and other components which are generally not desired within the gas collection chamber 58b.

To allow for attachment of an adjacent electrode frame 56 or membrane frame 54, a plurality of recesses 72a and 72b, as well as an indent 68 may be provided as previously described. FIG. 54 shows a side view of one configuration of the manifold frame 32. FIG. 55 shows a cutaway view of the configuration shown in FIG. 54. FIG. 55 shows a side porting configuration wherein the gas collection chambers 74a and 74b are connected to transversely opening gas outlet ports 22'a and 22'b which function in the same manner as the vertically opening gas outlet ports 22a and 22b shown and described previously relative to FIGS. 1 and 7. FIG. 56 shows the end or top porting configuration previously shown and described in FIG. 1 for example.

FIGS. 57-60 show an endplate 30a which forms an opposing longitudinal side to the electrolysis unit relative to the endplate 30b previously described. In particular, this endplate 30a also provides a surface defining a void 64 through which the electrode studded would fit to engage in electrode on the inner surface of the endplate frame 30a which is generally received with in the recess 76. An alignment detent 52 is provided which align and engages the endplate frame 30a against an adjacent electrode frame, membrane frame, or potentially a manifold frame. As the inner surface 138 generally engages the surface of a frame having recesses thereupon rather then detents such as the detent 74, and 116, the indents 72a, 72b, and 68 may be omitted on this frame.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:
1. A modular electrolysis system comprising:
   a. an exterior surface;
   b. a first endplate comprising;
      i. a first longitudinal side;
      ii. a first endplate electrode;
   c. a plurality of membrane frames, each membrane frame comprising:
      i. a first longitudinal side facing the first endplate;
      ii. a surface defining a first gas production chamber which extends longitudinally through the membrane frame;
      iii. a surface defining a portion of an electrolyte distribution chamber extending longitudinally through an upper region of the membrane frame;
      iv. a surface defining a portion of a first gas collection chamber extending longitudinally through the membrane frame wherein the first gas collection chamber is at an upward region of the first gas production chamber and the first gas collection chamber is in fluid communication with the first gas production chamber;
      v. a surface defining a second longitudinal side;
      vi. a surface defining a second gas collection chamber extending longitudinally through the membrane frame wherein the second gas collection chamber passes longitudinally through the first gas production chamber and the second gas collection chamber is not in fluid communication with the first gas production chamber;
   d. wherein one membrane frame is provided adjacent the first endplate;
   e. at least one passive electrode frame comprising:
      i. a first longitudinal side adjacent to and removably sealed to one of the membrane frames;
      ii. a surface defining a second gas production chamber which extends longitudinally through the passive electrode frame;
      iii. a surface defining a portion of the electrolyte distribution chamber extending longitudinally through an upper region of the membrane frame;

iv. a surface defining a electrolyte flow channel extending vertically from the electrolyte distribution to a lower region of the first gas producing chamber;
v. a surface defining a second gas collection chamber extending longitudinally through the membrane frame wherein the second gas collection chamber is at an upward region of the second gas production chamber and the second gas collection chamber is in fluid communication with the second gas production chamber;
vi. a surface defining a second longitudinal side;
f. a second endplate comprising:
i. a first longitudinal side facing the first endplate;
ii. a second endplate electrode on the first longitudinal side of the second endplate.

2. The modular electrolysis system as recited in claim 1 further comprising:
a. a manifold frame comprising:
i. a first longitudinal side in contact with an adjacent electrode frame or membrane frame;
ii. a surface defining a portion of the electrolyte distribution chamber extending longitudinally through the membrane frame and in fluid communication with the gas production chamber;
iii. a surface defining a portion of the first gas collection chamber extending longitudinally through the manifold frame;
iv. a surface defining a portion of the second gas collection chamber extending longitudinally through the membrane frame;
v. a surface defining a gas production chamber, wherein either the first gas collection chamber or the second gas collection chamber is in fluid communication with the gas production chamber at an upper region of the first or second gas collection chamber;
vi. a surface defining a first gas outlet port through the exterior surface of the modular electrolosis system, the first gas outlet port in fluid communication with the first gas collection chamber;
vii. a surface defining a second gas outlet port through the exterior surface of the modular electrolosis system, the first gas outlet port; in fluid communication with the second gas collection chamber;
viii. a surface defining an electrolyte fluid input port through the exterior surface of the modular electrolosis system, the the electrolyte input port in fluid communication with the electrolyte distribution chamber; and
ix. a second longitudinal side in contact with an adjacent membrane frame or electrode frame.

3. The modular electrolysis system as recited in claim 1 wherein the electrolyte flow channel transversely divides the gas production chamber into sub chambers which are fluidly isolated between a lower end of the electrolyte flow channel and an upper end of the electrolyte flow channel.

4. The modular electrolysis system as recited in claim 1 wherein the transverse dimension of each gas production chamber is substantially less than the vertical dimension of each gas production chamber.

5. The modular electrolysis system as recited in claim 1 wherein the transverse dimension of each gas production chamber is less than 20% of the vertical dimension of each gas production chamber.

6. The modular electrolysis system as recited in claim 1 further comprising a cooling water bath wherein the first endplate, electrode frames, membrane frames, and second endplate are substantially immersed in the cooling bath during operation of the system.

7. A modular electrolysis system comprising:
a. an exterior surface;
b. a first endplate comprising;
i. a first longitudinal side;
ii. a first endplate electrode;
c. a plurality of membrane frames, each membrane frame comprising:
i. a first longitudinal side facing the first endplate;
ii. a surface defining a first gas production chamber which extends longitudinally through the membrane frame;
iii. a surface defining a portion of an electrolyte distribution chamber extending longitudinally through an upper and laterally central region of the membrane frame;
iv. wherein the electrolyte flow channel transversely divides the first gas production chamber into laterally adjacent sub-chambers which are fluidly isolated between a lower end of the electrolyte flow channel and an upper end of the electrolyte flow channel;
v. a surface defining a portion of a first gas collection chamber extending longitudinally through the membrane frame wherein the first gas collection chamber is at an upward region of the first gas production chamber and the first gas collection chamber is in fluid communication with the first gas production chamber;
vi. a surface defining a second longitudinal side;
vii. a surface defining a second gas collection chamber extending longitudinally through the membrane frame wherein the second gas collection chamber passes longitudinally through the first gas production chamber and the second gas collection chamber is not in fluid communication with the first gas production chamber;
d. wherein one membrane frame is provided adjacent the first endplate;
e. at least one passive electrode frame comprising:
i. a first longitudinal side adjacent to and removably sealed to one of the membrane frames;
ii. a surface defining a second gas production chamber which extends longitudinally through the passive electrode frame;
iii. a surface defining a portion of the electrolyte distribution chamber extending longitudinally through an upper region of the membrane frame;
iv. a surface defining a electrolyte flow channel extending vertically from the electrolyte distribution to a lower region of the first gas producing chamber;
v. wherein the electrolyte flow channel transversely divides the first gas production chamber into sub chambers which are fluidly isolated between a lower end of the electrolyte flow channel and an upper end of the electrolyte flow channel;
vi. a surface defining a second gas collection chamber extending longitudinally through the membrane frame wherein the second gas collection chamber is at an upward region of the second gas production chamber and the second gas collection chamber is in fluid communication with the second gas production chamber;
vii. a surface defining a second longitudinal side;

f. a second endplate comprising:
  i. a first longitudinal side;
  ii. a second endplate electrode;
g. a manifold frame comprising:
  i. a first longitudinal side in contact with an adjacent electrode frame or membrane frame;
  ii. a surface defining a portion of the electrolyte distribution chamber extending longitudinally through the membrane frame and in fluid communication with the gas production chamber;
  iii. a surface defining a portion of the first gas collection chamber extending longitudinally through the manifold frame;
  iv. a surface defining a portion of the second gas collection chamber extending longitudinally through the membrane frame;
  v. a surface defining a gas production chamber, wherein either the first gas collection chamber or the second gas collection chamber is in fluid communication with the gas production chamber at an upper region of the first or second gas collection chamber;
  vi. a surface defining a first gas outlet port through the exterior surface of the modular electrolysis system, the first gas outlet port in fluid communication with the first gas collection chamber;
  vii. a surface defining a second gas outlet port through the exterior surface of the modular electrolysis system, the first gas outlet port; in fluid communication with the second gas collection chamber;
  viii. a surface defining an electrolyte fluid input port through the exterior surface of the modular electrolysis system, the electrolyte fluid input port in fluid communication with the electrolyte distribution chamber; and
  ix. a second longitudinal side in contact with an adjacent membrane frame or electrode frame.

* * * * *